US009355285B1

(12) United States Patent
Wade et al.

(10) Patent No.: US 9,355,285 B1
(45) Date of Patent: May 31, 2016

(54) TONE-BASED WAKE UP CIRCUIT FOR CARD READER (71) Applicant: Square, Inc., San Francisco, CA (US)

(72) Inventors: Jeremy Wade, San Francisco, CA (US); Matthew H. Maibach, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 14/620,699

(22) Filed: Feb. 12, 2015

(51) Int. Cl.
| G06K 7/00 | (2006.01) |
| G06K 7/01 | (2006.01) |
| G06K 7/08 | (2006.01) |
| G06Q 20/32 | (2012.01) |
| G06Q 20/34 | (2012.01) |
| G06F 1/32 | (2006.01) |

(52) U.S. Cl.
CPC .. *G06K 7/01* (2013.01); *G06K 7/00* (2013.01); *G06K 7/082* (2013.01); *G06F 1/3234* (2013.01); *G06K 7/0004* (2013.01); *G06K 7/089* (2013.01); *G06Q 20/322* (2013.01); *G06Q 20/353* (2013.01)

(58) Field of Classification Search
CPC ............ G06Q 20/322; G06Q 20/3272; G06Q 20/353; G06F 1/3234; G06F 9/4418; G06K 7/00; G06K 7/01; G06K 7/0004; G06K 7/082; G06K 7/089
USPC ....................................................... 233/439
See application file for complete search history.

(56) References Cited

U.S. PATENT DOCUMENTS

| 3,854,036 A | 12/1974 | Gupta et al. |
| 4,035,614 A | 7/1977 | Frattarola et al. |
| 4,254,441 A | 3/1981 | Fisher |
| 4,591,937 A | 5/1986 | Nakarai et al. |
| 4,609,957 A | 9/1986 | Gentet et al. |
| 4,727,544 A | 2/1988 | Brunner et al. |
| 4,788,420 A | 11/1988 | Chang et al. |
| 4,845,740 A | 7/1989 | Tokuyama et al. |
| 5,173,597 A | 12/1992 | Anglin |
| 5,266,789 A | 11/1993 | Anglin et al. |
| 5,406,627 A | 4/1995 | Thompson et al. |
| 5,434,395 A | 7/1995 | Storck et al. |
| 5,434,400 A | 7/1995 | Scherzer |

(Continued)

FOREIGN PATENT DOCUMENTS

| CA | 2 812 251 A1 | 4/2012 |
| CN | 302341093 S | 3/2013 |

(Continued)

OTHER PUBLICATIONS

Advisory Action mailed Aug. 24, 2012, for U.S. Appl. No. 13/010,976, of Babu, A. R., et al., filed Jan. 21, 2011.

(Continued)

*Primary Examiner* — Thien M Le
*Assistant Examiner* — Claude J Brown
(74) *Attorney, Agent, or Firm* — Polsinelli PC (57) ABSTRACT

A card reader for a point-of-sale system that is configured to accept both magnetic strip-type and integrated circuit (IC) chip-type payment cards. The card reader is a component of a point-of-sale system including a portable computing device in communication with the card reader that is configured to present a first graphical user interface (GUI) when a magnetic stripe-type card is detected and a second GUI when an IC chip-type card is detected in the card reader. The card reader comprises a slot configured to receive the payment card, a magnetic reading device and an IC chip reading device. The card reader also includes a discriminator contact disposed within the slot that is configured to conduct across a surface of a metal pad of the IC chip-type card prior to the CI chip reading device making contact with the IC chip.

20 Claims, 7 Drawing Sheets

(56) References Cited

U.S. PATENT DOCUMENTS

| | | |
|---|---|---|
| 5,463,678 A | 10/1995 | Kepley, III et al. |
| 5,589,855 A | 12/1996 | Blumstein et al. |
| 5,603,078 A | 2/1997 | Henderson et al. |
| 5,616,904 A | 4/1997 | Fernadez |
| 5,679,943 A | 10/1997 | Schultz et al. |
| 5,729,591 A | 3/1998 | Bailey |
| 5,764,742 A | 6/1998 | Howard et al. |
| 5,850,599 A | 12/1998 | Seiderman |
| 5,878,337 A | 3/1999 | Joao et al. |
| 5,907,801 A | 5/1999 | Albert et al. |
| 5,945,654 A | 8/1999 | Huang |
| 5,991,410 A | 11/1999 | Albert et al. |
| 5,991,749 A | 11/1999 | Morrill, Jr. |
| D417,442 S | 12/1999 | Butts et al. |
| 6,006,109 A | 12/1999 | Shin |
| 6,010,067 A | 1/2000 | Elbaum |
| 6,021,944 A | 2/2000 | Arakaki |
| 6,032,859 A | 3/2000 | Muehlberger et al. |
| 6,061,666 A | 5/2000 | Do et al. |
| 6,129,277 A | 10/2000 | Grant et al. |
| 6,234,389 B1 | 5/2001 | Valliani et al. |
| 6,308,227 B1 | 10/2001 | Kumar et al. |
| 6,363,139 B1 | 3/2002 | Zurek et al. |
| 6,400,517 B1 | 6/2002 | Murao |
| 6,431,445 B1 | 8/2002 | Deland et al. |
| 6,476,743 B1 | 11/2002 | Brown et al. |
| 6,481,623 B1 | 11/2002 | Grant et al. |
| 6,497,368 B1 | 12/2002 | Friend et al. |
| 6,536,670 B1 | 3/2003 | Postman et al. |
| 6,579,728 B2 | 6/2003 | Grant et al. |
| D477,321 S | 7/2003 | Baughman |
| 6,612,488 B2 | 9/2003 | Suzuki |
| 6,813,608 B1 | 11/2004 | Baranowski |
| 6,832,721 B2 | 12/2004 | Fujll |
| 6,850,147 B2 | 2/2005 | Prokoski et al. |
| 6,868,391 B1 | 3/2005 | Hultgren |
| 6,896,182 B2 | 5/2005 | Sakaguchi |
| 6,944,782 B2 | 9/2005 | von Mueller et al. |
| 6,979,231 B2 | 12/2005 | Shinohara |
| 7,003,316 B1 | 2/2006 | Elias et al. |
| 7,013,149 B2 | 3/2006 | Vetro et al. |
| 7,149,296 B2 | 12/2006 | Brown et al. |
| 7,163,148 B2 | 1/2007 | Durbin et al. |
| 7,167,711 B1 | 1/2007 | Dennis |
| 7,252,232 B2 | 8/2007 | Fernandes et al. |
| 7,309,012 B2 | 12/2007 | Von Mueller et al. |
| 7,324,836 B2 | 1/2008 | Steenstra et al. |
| 7,363,054 B2 | 4/2008 | Elias et al. |
| D575,056 S | 8/2008 | Tan |
| 7,409,234 B2 | 8/2008 | Glezerman |
| 7,424,732 B2 | 9/2008 | Matsumoto et al. |
| 7,433,452 B2 | 10/2008 | Taylor et al. |
| 7,505,762 B2 | 3/2009 | Onyon et al. |
| D590,828 S | 4/2009 | Sherrod et al. |
| 7,520,430 B1 | 4/2009 | Stewart et al. |
| 7,581,678 B2 | 9/2009 | Narendra et al. |
| 7,600,673 B2 | 10/2009 | Stoutenberg et al. |
| D607,000 S | 12/2009 | Cheng et al. |
| 7,703,676 B2 | 4/2010 | Hart et al. |
| 7,708,189 B1 | 5/2010 | Cipriano |
| 7,757,953 B2 | 7/2010 | Hart et al. |
| 7,793,834 B2 | 9/2010 | Hachey et al. |
| 7,810,729 B2 | 10/2010 | Morley, Jr. |
| 7,869,591 B1 | 1/2011 | Nagel et al. |
| 7,896,248 B2 | 3/2011 | Morley, Jr. |
| 7,918,394 B1 | 4/2011 | Morley, Jr. |
| 7,945,494 B2 | 5/2011 | Williams |
| 8,015,070 B2 | 9/2011 | Sinha et al. |
| D646,264 S | 10/2011 | Dong |
| D653,664 S | 2/2012 | Turnbull et al. |
| 8,132,670 B1 | 3/2012 | Chen |
| 8,231,055 B2 | 7/2012 | Wen |
| 8,297,507 B2 | 10/2012 | Kayani |
| 8,302,860 B2 | 11/2012 | McKelvey |
| 8,336,771 B2 | 12/2012 | Tsai et al. |
| D675,618 S | 2/2013 | Behar et al. |
| 8,376,239 B1 | 2/2013 | Humphrey |
| D677,667 S | 3/2013 | Smith et al. |
| D679,714 S | 4/2013 | Smith et al. |
| D680,537 S | 4/2013 | Miller et al. |
| 8,413,901 B2 | 4/2013 | Wen |
| 8,452,004 B2 | 5/2013 | Lee |
| D686,208 S | 7/2013 | Miller et al. |
| 8,500,010 B1 | 8/2013 | Marcus et al. |
| 8,500,018 B2 | 8/2013 | McKelvey et al. |
| 8,560,823 B1 | 10/2013 | Aytek et al. |
| 8,571,989 B2 | 10/2013 | Dorsey et al. |
| 8,573,486 B2 | 11/2013 | McKelvey et al. |
| 8,573,487 B2 | 11/2013 | McKelvey |
| 8,573,489 B2 | 11/2013 | Dorsey et al. |
| 8,584,946 B2 | 11/2013 | Morley, Jr. |
| 8,584,956 B2 | 11/2013 | Wilson et al. |
| 8,602,305 B2 | 12/2013 | Dorsey et al. |
| 8,612,352 B2 | 12/2013 | Dorsey et al. |
| 8,615,445 B2 | 12/2013 | Dorsey et al. |
| 8,640,953 B2 | 2/2014 | Dorsey et al. |
| D700,606 S | 3/2014 | Lo |
| 8,662,389 B2 | 3/2014 | Dorsey et al. |
| 8,678,277 B2 | 3/2014 | Dorsey et al. |
| D703,211 S | 4/2014 | Weller et al. |
| 8,701,996 B2 | 4/2014 | Dorsey et al. |
| 8,701,997 B2 | 4/2014 | Dorsey et al. |
| D706,266 S | 6/2014 | Rotsaert |
| 8,740,072 B1 | 6/2014 | Dorogusker |
| 8,763,900 B2 | 7/2014 | Marcus et al. |
| D711,876 S | 8/2014 | McWilliam et al. |
| 8,794,517 B1 | 8/2014 | Templeton et al. |
| D712,892 S | 9/2014 | Hong et al. |
| 8,820,650 B2 | 9/2014 | Wilson et al. |
| 8,840,017 B2 | 9/2014 | Chan et al. |
| 8,840,024 B2 | 9/2014 | McKelvey et al. |
| 8,870,070 B2 | 10/2014 | McKelvey et al. |
| 8,870,071 B2 | 10/2014 | McKelvey |
| 8,876,003 B2 | 11/2014 | McKelvey |
| 8,910,868 B1 | 12/2014 | Wade et al. |
| 8,931,699 B1 | 1/2015 | Wade et al. |
| D724,094 S | 3/2015 | Blochinger et al. |
| D725,655 S | 3/2015 | Debaigue et al. |
| 8,967,465 B1 | 3/2015 | Wade et al. |
| D726,171 S | 4/2015 | Edwards |
| 9,016,570 B1 | 4/2015 | Gluck |
| 9,016,572 B2 | 4/2015 | Babu et al. |
| D728,549 S | 5/2015 | Su et al. |
| D728,568 S | 5/2015 | Debaigue et al. |
| D731,493 S | 6/2015 | Mills |
| 9,063,737 B2 | 6/2015 | Babu et al. |
| D740,820 S | 10/2015 | Templeton et al. |
| 2001/0001856 A1 | 5/2001 | Gould et al. |
| 2002/0002507 A1 | 1/2002 | Hatakeyama |
| 2002/0030871 A1 | 3/2002 | Anderson et al. |
| 2002/0073304 A1 | 6/2002 | Marsh et al. |
| 2002/0077974 A1 | 6/2002 | Ortiz |
| 2002/0099648 A1 | 7/2002 | DeVoe et al. |
| 2002/0108062 A1 | 8/2002 | Nakajima et al. |
| 2002/0165462 A1 | 11/2002 | Westbrook et al. |
| 2002/0169541 A1 | 11/2002 | Bouve et al. |
| 2002/0188535 A1 | 12/2002 | Chao et al. |
| 2003/0089772 A1 | 5/2003 | Chien |
| 2003/0132300 A1 | 7/2003 | Dilday et al. |
| 2003/0135463 A1 | 7/2003 | Brown et al. |
| 2003/0144040 A1 | 7/2003 | Liu et al. |
| 2004/0011650 A1 | 1/2004 | Zenhausern et al. |
| 2004/0012875 A1 | 1/2004 | Wood |
| 2004/0033726 A1 | 2/2004 | Kao |
| 2004/0041911 A1 | 3/2004 | Odagiri et al. |
| 2004/0058705 A1 | 3/2004 | Morgan et al. |
| 2004/0087339 A1 | 5/2004 | Goldthwaite et al. |
| 2004/0093496 A1 | 5/2004 | Colnot |
| 2004/0104268 A1 | 6/2004 | Bailey |
| 2004/0127256 A1 | 7/2004 | Goldthwaite et al. |
| 2004/0128256 A1 | 7/2004 | Krouse et al. |
| 2004/0151026 A1 | 8/2004 | Naso et al. |
| 2004/0204074 A1 | 10/2004 | Desai |
| 2004/0204082 A1 | 10/2004 | Abeyta |

(56) References Cited

U.S. PATENT DOCUMENTS

| | | |
|---|---|---|
| 2004/0230489 A1 | 11/2004 | Goldthwaite et al. |
| 2004/0230526 A1 | 11/2004 | Praisner |
| 2005/0009004 A1 | 1/2005 | Xu et al. |
| 2005/0010702 A1 | 1/2005 | Saito et al. |
| 2005/0077870 A1 | 4/2005 | Ha et al. |
| 2005/0156037 A1 | 7/2005 | Wurzburg |
| 2005/0156038 A1 | 7/2005 | Wurzburg et al. |
| 2005/0194452 A1 | 9/2005 | Nordentoft et al. |
| 2005/0209719 A1 | 9/2005 | Beckert et al. |
| 2005/0236480 A1 | 10/2005 | Vrotsos et al. |
| 2005/0242173 A1 | 11/2005 | Suzuki |
| 2005/0247787 A1 | 11/2005 | Von Mueller et al. |
| 2006/0000917 A1 | 1/2006 | Kim et al. |
| 2006/0049256 A1 | 3/2006 | Von Mueller et al. |
| 2006/0094481 A1 | 5/2006 | Gullickson |
| 2006/0122902 A1 | 6/2006 | Petrov et al. |
| 2006/0152276 A1 | 7/2006 | Barksdale |
| 2006/0208066 A1 | 9/2006 | Finn et al. |
| 2006/0219776 A1 | 10/2006 | Finn |
| 2006/0223580 A1 | 10/2006 | Antonio et al. |
| 2006/0234771 A1 | 10/2006 | Shavrov |
| 2006/0273158 A1 | 12/2006 | Suzuki |
| 2007/0063048 A1 | 3/2007 | Havens et al. |
| 2007/0067833 A1 | 3/2007 | Colnot |
| 2007/0100651 A1 | 5/2007 | Ramer et al. |
| 2007/0124211 A1 | 5/2007 | Smith |
| 2007/0155430 A1 | 7/2007 | Cheon et al. |
| 2007/0174080 A1 | 7/2007 | Outwater |
| 2007/0201492 A1 | 8/2007 | Kobayashi |
| 2007/0221728 A1 | 9/2007 | Ferro et al. |
| 2007/0244811 A1 | 10/2007 | Tumminaro |
| 2007/0250623 A1 | 10/2007 | Hickey et al. |
| 2007/0255620 A1 | 11/2007 | Tumminaro et al. |
| 2007/0255643 A1 | 11/2007 | Capuano et al. |
| 2007/0255653 A1 | 11/2007 | Tumminaro et al. |
| 2007/0287498 A1 | 12/2007 | Wang et al. |
| 2008/0027815 A1 | 1/2008 | Johnson et al. |
| 2008/0040265 A1 | 2/2008 | Rackley, III et al. |
| 2008/0040274 A1 | 2/2008 | Uzo |
| 2008/0059370 A1 | 3/2008 | Sada et al. |
| 2008/0059375 A1 | 3/2008 | Abifaker |
| 2008/0103972 A1 | 5/2008 | Lane |
| 2008/0147564 A1 | 6/2008 | Singhal |
| 2008/0172306 A1 | 7/2008 | Schorr et al. |
| 2008/0177662 A1 | 7/2008 | Smith et al. |
| 2008/0208762 A1 | 8/2008 | Arthur et al. |
| 2008/0238610 A1 | 10/2008 | Rosenberg |
| 2008/0249939 A1 | 10/2008 | Veenstra |
| 2008/0275779 A1 | 11/2008 | Lakshminarayanan |
| 2009/0048978 A1 | 2/2009 | Ginter et al. |
| 2009/0068982 A1 | 3/2009 | Chen et al. |
| 2009/0098908 A1 | 4/2009 | Silverbrook et al. |
| 2009/0100168 A1 | 4/2009 | Harris |
| 2009/0104920 A1 | 4/2009 | Moon et al. |
| 2009/0117883 A1 | 5/2009 | Coffing et al. |
| 2009/0119190 A1 | 5/2009 | Realini |
| 2009/0125429 A1 | 5/2009 | Takayama |
| 2009/0144161 A1 | 6/2009 | Fisher |
| 2009/0159681 A1 | 6/2009 | Mullen et al. |
| 2009/0166422 A1 | 7/2009 | Biskupski |
| 2009/0187492 A1 | 7/2009 | Hammad et al. |
| 2010/0063893 A1 | 3/2010 | Townsend |
| 2010/0127857 A1 | 5/2010 | Kilmurray et al. |
| 2010/0184479 A1 | 7/2010 | Griffin, Jr. |
| 2010/0191653 A1 | 7/2010 | Johnson et al. |
| 2010/0222000 A1 | 9/2010 | Sauer et al. |
| 2010/0241838 A1 | 9/2010 | Cohen et al. |
| 2010/0243732 A1 | 9/2010 | Wallner |
| 2010/0289390 A1 | 11/2010 | Kenney |
| 2011/0033910 A1 | 2/2011 | Maho et al. |
| 2011/0053560 A1 | 3/2011 | Jain et al. |
| 2011/0084131 A1 | 4/2011 | McKelvey |
| 2011/0084139 A1 | 4/2011 | McKelvey et al. |
| 2011/0137803 A1 | 6/2011 | Willins |
| 2011/0161235 A1 | 6/2011 | Beenau et al. |
| 2011/0165896 A1 | 7/2011 | Stromberg et al. |
| 2011/0174879 A1 | 7/2011 | Morley, Jr. |
| 2011/0191196 A1 | 8/2011 | Orr et al. |
| 2011/0198395 A1 | 8/2011 | Chen |
| 2011/0202463 A1 | 8/2011 | Powell |
| 2011/0258120 A1 | 10/2011 | Weiss |
| 2011/0313880 A1 | 12/2011 | Paul et al. |
| 2012/0008851 A1 | 1/2012 | Pennock et al. |
| 2012/0011071 A1 | 1/2012 | Pennock et al. |
| 2012/0012653 A1 | 1/2012 | Johnson et al. |
| 2012/0016794 A1 | 1/2012 | Orr et al. |
| 2012/0026018 A1 | 2/2012 | Lin |
| 2012/0052910 A1 | 3/2012 | Mu et al. |
| 2012/0095867 A1* | 4/2012 | McKelvey ............ G06Q 20/322 705/26.41 |
| 2012/0095870 A1 | 4/2012 | McKelvey |
| 2012/0097739 A1 | 4/2012 | Babu et al. |
| 2012/0097740 A1 | 4/2012 | Lamba et al. |
| 2012/0118956 A1 | 5/2012 | Lamba et al. |
| 2012/0118959 A1 | 5/2012 | Sather et al. |
| 2012/0118960 A1 | 5/2012 | Sather et al. |
| 2012/0126005 A1 | 5/2012 | Dorsey et al. |
| 2012/0126006 A1 | 5/2012 | Dorsey et al. |
| 2012/0126007 A1 | 5/2012 | Lamba et al. |
| 2012/0126010 A1 | 5/2012 | Babu et al. |
| 2012/0126011 A1 | 5/2012 | Lamba et al. |
| 2012/0126012 A1 | 5/2012 | Lamba et al. |
| 2012/0126013 A1 | 5/2012 | Sather et al. |
| 2012/0126014 A1 | 5/2012 | Sather et al. |
| 2012/0130903 A1 | 5/2012 | Dorsey et al. |
| 2012/0132712 A1 | 5/2012 | Babu et al. |
| 2012/0138683 A1 | 6/2012 | Sather et al. |
| 2012/0154561 A1 | 6/2012 | Chari |
| 2012/0168505 A1 | 7/2012 | Sather et al. |
| 2012/0234918 A1 | 9/2012 | Lindsay |
| 2012/0246074 A1 | 9/2012 | Annamalai et al. |
| 2012/0259651 A1 | 10/2012 | Mallon et al. |
| 2012/0270528 A1 | 10/2012 | Goodman |
| 2012/0293001 A1* | 11/2012 | Chan .................... G07F 7/0873 307/66 |
| 2013/0021046 A1* | 1/2013 | Prentice ............... H04R 29/004 324/705 |
| 2013/0031004 A1 | 1/2013 | Dorsey et al. |
| 2013/0087614 A1 | 4/2013 | Limtao et al. |
| 2013/0137367 A1 | 5/2013 | Fisher |
| 2013/0200153 A1 | 8/2013 | Dorsey et al. |
| 2013/0207481 A1 | 8/2013 | Gobburu et al. |
| 2013/0254117 A1 | 9/2013 | von Mueller et al. |
| 2013/0290762 A1* | 10/2013 | Pawar .................. G06F 1/3215 713/323 |
| 2013/0304244 A1 | 11/2013 | Ojanpera |
| 2014/0001257 A1 | 1/2014 | Dorsey et al. |
| 2014/0001263 A1 | 1/2014 | Babu et al. |
| 2014/0017955 A1 | 1/2014 | Lo et al. |
| 2014/0018016 A1 | 1/2014 | Chang et al. |
| 2014/0061301 A1 | 3/2014 | Cho et al. |
| 2014/0076964 A1 | 3/2014 | Morley, Jr. |
| 2014/0089205 A1 | 3/2014 | Kapur et al. |
| 2014/0097242 A1 | 4/2014 | McKelvey |
| 2014/0124576 A1 | 5/2014 | Zhou et al. |
| 2014/0131442 A1 | 5/2014 | Morrow et al. |
| 2014/0144625 A1 | 5/2014 | Dorsey et al. |
| 2014/0203082 A1 | 7/2014 | Huh |
| 2014/0258132 A1* | 9/2014 | Swamy ................ G06K 7/0004 705/67 |
| 2014/0295761 A1* | 10/2014 | Lo ........................ H04W 12/04 455/41.2 |
| 2015/0078560 A1* | 3/2015 | Ilango ................. H04R 29/001 381/59 |
| 2015/0149992 A1 | 5/2015 | Wade et al. |
| 2015/0161419 A1 | 6/2015 | Wade et al. |
| 2015/0199677 A1 | 7/2015 | Wade et al. |

FOREIGN PATENT DOCUMENTS

| | | |
|---|---|---|
| CN | 302526592 S | 8/2013 |
| EP | 1 145 766 A2 | 10/2001 |
| JP | 2003-108777 A | 4/2003 |
| JP | 2004-078662 A | 3/2004 |

(56) References Cited

FOREIGN PATENT DOCUMENTS

| | | |
|---|---|---|
| JP | 2005-063869 A | 3/2005 |
| JP | 2005-242550 A | 9/2005 |
| JP | 2005-269172 A | 9/2005 |
| JP | 2009-199649 A | 9/2009 |
| JP | 2001-313714 A | 11/2011 |
| JP | 2013-518344 A | 5/2013 |
| KR | 10-0452161 B1 | 10/2004 |
| KR | 10-2005-0077659 A | 8/2005 |
| KR | 10-2008-0039330 A | 5/2008 |
| WO | 01/65827 A2 | 9/2001 |
| WO | 02/084548 A1 | 10/2002 |
| WO | 2007/070592 A2 | 6/2007 |
| WO | 2009/128483 A1 | 10/2009 |
| WO | 2010/097711 A2 | 9/2010 |
| WO | 2010/111130 A2 | 9/2010 |
| WO | 2010/135174 A1 | 11/2010 |
| WO | 2011/047028 A2 | 4/2011 |
| WO | 2011/047030 A2 | 4/2011 |
| WO | 2012/051070 A2 | 4/2012 |
| WO | 2013/009891 A1 | 1/2013 |
| WO | 2013/074499 A1 | 5/2013 |
| WO | 2015/081002 A1 | 6/2015 |
| WO | 2015/089301 A1 | 6/2015 |

OTHER PUBLICATIONS

Non-Final Office Action mailed Aug. 15, 2014, for U.S. Appl. No. 13/010,976, of Babu, A. R., et al., filed Jan. 21, 2011.
Notice of Allowance mailed Dec. 24, 2014, for U.S. Appl. No. 13/010,976, of Babu, A. R., et al., filed Jan. 21, 2011.
Non-Final Office Action mailed Apr. 2, 2014, for U.S. Appl. No. 14/012,655, of McKelvey, J., filed Aug. 28, 2013.
Final Office Action mailed Aug. 15, 2014, for U.S. Appl. No. 14/012,655, of McKelvey, J., filed Aug. 28, 2013.
Non-Final Office Action mailed Jan. 20, 2015, for U.S. Appl. No. 14/012,655, of McKelvey, J., filed Aug. 28, 2013.
Notice of Allowance mailed Sep. 1, 2015, for U.S. Appl. No. 13/298,487, of Babu, A., et al., filed Nov. 17, 2011.
Non-Final Office Action mailed Apr. 29, 2013, for U.S. Appl. No. 13/298,487, of Babu, A., et al., filed Nov. 17, 2011.
Final Office Action mailed Aug. 22, 2013, for U.S. Appl. No. 13/298,487, of Babu, A., et al., filed Nov. 17, 2011.
Advisory Action mailed Oct. 22, 2013, for U.S. Appl. No. 13/298,487, of Babu, A., et al., filed Nov. 17, 2011.
Non-Final Office Action mailed Aug. 21, 2014, for U.S. Appl. No. 13/298,487, of Babu, A., et al., filed Nov. 17, 2011.
Final Office Action mailed Mar. 18, 2015, for U.S. Appl. No. 13/298,487, of Babu, A., et al., filed Nov. 17, 2011.
Non-Final Office Action mailed Feb. 20, 2015, for U.S. Appl. No. 14/512,104, of Templeton, T., et al., filed Oct. 10, 2014.
International Search Report and Written Opinion for PCT Application No. PCT/US2010/052483, mailed Jun. 10, 2011.
International Search Report and Written Opinion for PCT Application No. PCT/US2011/055386, mailed Feb. 22, 2012.
European Search Report and Opinion for European Application No. 11833172.7, mailed Apr. 22, 2014.
International Search Report and Written Opinion for PCT Application No. PCT/US2014/069788, mailed May 14, 2015.
International Search Report and Written Opinion for PCT Application No. PCT/US2012/064782, mailed Feb. 26, 2013.
International Search Report and Written Opinion for PCT Application No. PCT/US2010/052481, mailed Jun. 23, 2011.
International Search Report and Written Opinion for PCT Application No. PCT/US2014/067074, mailed Mar. 15, 2015.
Examination Report for Canadian Application No. 2,812,594, mailed on Feb. 24, 2015.
Examination Report No. 1 for Australian Application No. 201415781, mailed on Feb. 23, 2015 (Registration No. 359005).
"Review: Square, Inc. Square Credit Card Reader (2013)," iLounge, Retrieved from the Internet URL: http://www.ilounge.com/index.php/review/entry/square-inc.-square-credit-card-reader-2013/, on Jan. 16, 2014, pp. 3.
"TUAW The Unofficial Apple Weblog, Square credit card reader loses weight, gains accuracy", Retrieved from the Internet URL: http://www.tuaw.com/2013/12/09/square-credit-card--reader-loses-weight-gains-accuracy/, on Dec. 9, 2013, p. 1.
Examination Report No. 2 for Australian Application No. 201415781, mailed Aug. 13, 2015 (Registration No. 359005).
Ryan, P., "Plug and Pay: A Gallery of 26 Mobile Card Readers," Aug. 20, 2013, Retrieved from the Internet URL: http://bankinnovation.net/2013/08/plug-and-pay-a-gallery-of-26-mobile-card-readers/, on Feb. 19, 2015, pp. 1-12.
Notification of Registration of a Design for Australian Application No. 201415781, mailed on Nov. 27, 2014 (Registration No. 359005).
First Examination Report for Indian Design Application No. 267386, mailed Feb. 5, 2015.
Non-Final Office Action mailed Apr. 25, 2013, for U.S. Appl. No. 13/298,491, of Lamba, K., et al., filed Nov. 17, 2011.
Final Office Action mailed Sep. 17, 2013, for U.S. Appl. No. 13/298,491, of Lamba, K. et al., filed Nov. 17, 2011.
Advisory Action mailed Oct. 22, 2013, for U.S. Appl. No. 13/298,491, of Lamba, K., et al., filed Nov. 17, 2011.
Non-Final Office Action mailed Jul. 17, 2014, for U.S. Appl. No. 13/298,491, of Lamba, K., et al., filed Nov. 17, 2011.
Final Office Action mailed Feb. 4, 2015, for U.S. Appl. No. 13/298,491, of Lamba, K., et al., filed Nov. 17, 2011.
Notice of Allowance mailed Jun. 22, 2015, for U.S. Appl. No. 13/298,491, of Lamba, K., et al., filed Nov. 17, 2011.
Non-Final Office Action mailed Jun. 6, 2014, for U.S. Appl. No. 14/231,598, of Wade, J., et al., filed Mar. 31, 2014.
Non-Final Office Action mailed Apr. 10, 2015, for U.S. Appl. No. 14/189,997, of Lamfalusi, M., et al., filed Feb. 25, 2014.
Notice of Allowance mailed Nov. 25, 2014, for U.S. Appl. No. 14/231,598, of Claude, J.B., et al., filed Mar. 31, 2014.
Non-Final Office Action mailed Jun. 22, 2015, for U.S. Appl. No. 14/322,815, of Edwards, T., filed Jul. 2, 2014.
Notice of Allowance mailed Aug. 1, 2014, for U.S. Appl. No. 14/203,463, of Wade, J., et al., filed Mar. 10, 2014.
Notice of Allowance mailed Aug. 27, 2015, for U.S. Appl. No. 13/298,501, of Babu, A., et al., filed Nov. 17, 2011.
Non-Final Office Action mailed Sep. 11, 2014, for U.S. Appl. No. 13/298,501, of Babu, A., et al., filed Nov. 17, 2011.
Final Office Action mailed May 6, 2015, for U.S. Appl. No. 13/298,501, of Babu, A., et al., filed Nov. 17, 2011.
Notice of Allowance mailed Oct. 17, 2014, for U.S. Appl. No. 14/220,967, of Wade, J., et al., filed Mar. 20, 2014.
Notice of Allowance mailed Dec. 18, 2014, for U.S. Appl. No. 14/220,967, of Wade, J., et al., filed Mar. 20, 2014.
Notice of Allowance mailed May 19, 2015, for U.S. Appl. No. 14/620,765, of Wade, J., et al., filed Feb. 12, 2015.
Non-Final Office Action mailed May 26, 2015, for U.S. Appl. No. 14/551,681, of Wade, J., et al., filed Nov. 24, 2014.
Notice of Allowance mailed Jun. 10, 2014, for U.S. Appl. No. 29/491,147, of Templeton T., et al., filed May 16, 2014.
Non-Final Office Action mailed Sep. 11, 2014, for U.S. Appl. No. 13/298,506, of Lamba, K., et al., filed Nov. 17, 2011.
Final Office Action mailed May 6, 2015, for U.S. Appl. No. 13/298,506, of Lamba, K., et al., filed Nov. 17, 2011.
Non-Final Office Action mailed Sep. 30, 2011, for U.S. Appl. No. 13/005,822, of McKelvey, J., et al., filed Jan. 13, 2011.
Notice of Allowance mailed Aug. 28, 2015, for U.S. Appl. No. 13/298,510, of Lamba, K. et al., filed Nov. 17, 2011.
Non-Final Office Action mailed Sep. 11, 2014, for U.S. Appl. No. 13/298,510, of Lamba, K. et al., filed Nov. 17, 2011.
Final Office Action mailed May 6, 2015, for U.S. Appl. No. 13/298,510, of Lamba, K. et al., filed Nov. 17, 2011.
Final Office Action mailed Jul. 9, 2012, for U.S. Appl. No. 13/005,822, of McKelvey, J., et al., filed Jan. 13, 2011.
Non-Final Office Action mailed Jun. 18, 2013, for U.S. Appl. No. 13/005,822, of McKelvey, J., et al., filed Jan. 13, 2011.
Non-Final Office Action mailed Dec. 10, 2013, for U.S. Appl. No. 13/005,822 of McKelvey, J., et al., filed Jan. 13, 2011.
Non-Final Office Action mailed Oct. 7, 2011, for U.S. Appl. No. 13/043,258, of McKelvey, J., filed Mar. 8, 2011.

(56) References Cited

OTHER PUBLICATIONS

Final Office Action mailed Jul. 13, 2012, for U.S. Appl. No. 13/043,258, of McKelvey, J., filed Mar. 8, 2011.
Non-Final Office Action mailed Dec. 11, 2013, for U.S. Appl. No. 13/043,258, of McKelvey, J., filed Mar. 8, 2011.
Notice of Allowance mailed Jul. 1, 2014, for U.S. Appl. No. 13/043,258, of McKelvey, J., filed Mar. 8, 2011.
Advisory Action mailed Aug. 15, 2012, for U.S. Appl. No. 13/043,258, of McKelvey, J., filed Mar. 8, 2011.
Advisory Action mailed Aug. 17, 2012, for U.S. Appl. No. 13/005,822, of McKelvey, J.,et al., filed Jan. 13, 2011.
Notice of Allowance mailed Jun. 24, 2014, for U.S. Appl. No. 13/005,822, of McKelvey, J., et al., filed Jan. 13, 2011.
Non-Final Office Action mailed Oct. 7, 2014, for U.S. Appl. No. 13/298,534, of Lamba, K., et al., filed Nov. 17, 2011.
Final Office Action mailed Apr. 8, 2015, for U.S. Appl. No. 13/298,534, of Lamba, K., et al., filed Nov. 17, 2011.
Final Office Action mailed Sep. 6, 2013, for U.S. Appl. No. 13/298,560, of Lamba K. et al., filed Nov. 17, 2011.
Advisory Action mailed Oct. 21, 2013, for U.S. Appl. No. 13/298,560 of Lamba K. et al., filed Nov. 17, 2011.
Final Office Action mailed Aug. 15, 2013, for U.S. Appl. No. 13/043,263, of McKelvey, J., filed Mar. 8, 2011.
Advisory Action mailed Nov. 8, 2013, for U.S. Appl. No. 13/043,263, of McKelvey, J., filed Mar. 8, 2011.
Non-Final Office Action mailed Feb. 24, 2014, for U.S. Appl. No. 13/043,263, of McKelvey, J., filed Mar. 8, 2011.
Notice of Allowance mailed Jul. 15, 2014, for U.S. Appl. No. 13/043,263, of McKelvey, J., filed Mar. 8, 2011.
Non-Final Office Action mailed Jul. 22, 2014, for U.S. Appl. No. 13/298,560, of Lamba K. et al., filed Nov. 17, 2011.
Final Office Action mailed Jan. 28, 2015, for U.S. Appl. No. 13/298,560, of Lamba K. et al., filed Nov. 17, 2011.
Non-Final Office Action mailed Oct. 11, 2011, for U.S. Appl. No. 13/043,203, of McKelvey. J., et al., filed Mar. 8, 2011.
Final Office Action mailed Jul. 6, 2012, for U.S. Appl. No. 13/043,203, of McKelvey. J., et al., filed Mar. 8, 2011.
Non-Final, office Action mailed Oct. 11, 2011, for U.S. Appl. No. 13/043,263, of McKelvey, J., filed Mar. 8, 2011.
Advisory Action mailed Aug. 1, 2012, for U.S. Appl. No. 13/043,203, of McKelvey, J., filed Mar. 8, 2011.
Advisory Action mailed Aug. 16, 2012, for U.S. Appl. No. 13/043,263, of McKelvey, J., filed Mar. 8, 2011.
Non-Final, Office Action mailed Apr. 29, 2013, for U.S. Appl. No. 13/043,263, of McKelvey, J., filed Mar. 8, 2011.
Non-Final office Action mailed Apr. 30, 2013, for U.S. Appl. No. 13/043,203, of McKelvey, J., filed Mar. 8, 2011.
Non-Final Office Action mailed May 28, 2013, for U.S. Appl. No. 13/298,560, of Lamba K. et al., filed Nov. 17, 2011.
Notice of Allowance mailed Jul. 9, 2013, for U.S. Appl. No. 13/043,203, of McKelvey, J., filed Mar. 8, 2011.
Non-Final Office Action mailed Jul. 6, 2015, for U.S. Appl. No. 13/298,534, of Lamba K. et al., filed Nov. 17, 2011.
Advisory Action mailed Apr. 9, 2015, for U.S. Appl. No. 13/298,560, of Lamba K. et al., filed Nov. 17, 2011.
Final office Action mailed Jul. 9, 2012, for U.S. Appl. No. 13/043,263, of McKelvey, J., filed Mar. 8, 2011.
Non-Final Office Action mailed Jul. 16, 2015, for U.S. Appl. No. 13/298,560, of Lamba K. et al., filed Nov. 17, 2011.
Application for Registration of an Industrial Design Examiner's Report for Canadian Design Application No. 159528, mailed Jun. 11, 2015.
English-language translation of Notice of Reasons for Rejection for Japanese Application No. 2014-0255525, mailed Mar. 31, 2015.
Certificate of Registration of Design for Indian Design Application No. 267386 mailed Nov. 14, 2014 (Registration No. 39149).
Non-Final Office Action mailed Jul. 27, 2015, for U.S. Appl. No. 29/493,212, of Edwards, T., et al., filed Jun. 6, 2014.
English-language translation of Decision of Final Rejection for Japanese Patent Application No. 2013-533897, mailed Feb. 23, 2015.
English-language translation of Office Action for Japanese Patent Application No. 2013-533897, mailed Jun. 5, 2014.
English-language translation of Search Report for Japanese Patent Application No. 2013-533897, mailed Apr. 14, 2014.
Certificate of Design Registration for European Patent Application No. 002578674, mailed Nov. 14, 2014 (Registration No. 002578674-0001).
Notice of Allowance mailed Sep. 2, 2015, for U.S. Appl. No. 14/578,107, of Wade, J. et al., filed Dec. 19, 2014.
Advisory Action mailed Sep. 11, 2015 for U.S. Appl. No. 13/298,506, of Lamba, K., et al., filed Nov. 17, 2011.
Notice of Allowance mailed Sep. 16, 2015 for U.S. Appl. No. 14/551,681, of Wade, J., et al., filed Nov. 24, 2014.
Notice of Allowance mailed Oct. 5, 2015 for U.S. Appl. No. 14/322,815, of Edwards, T., filed Jul. 2, 2014.
Notice of Allowance mailed Oct. 6, 2015 for U.S. Appl. No. 13/298,491, of Lamba, K., et al., filed Nov. 17, 2011.
Notice of Allowance mailed Oct. 7, 2015 for U.S. Appl. No. 13/298,510, of Lamba, K., et al., filed Nov. 17, 2011.
Notice of Allowance mailed Oct. 8, 2015 for U.S. Appl. No. 13/298,487, of Lamba, K., et al., filed Nov. 17, 2011.
Notice of Allowance mailed Oct. 13, 2015 for U.S. Appl. No. 14/578,107, of Wade, J., et al., filed Dec. 19, 2014.
Non-Final Office Action mailed Oct. 29, 2015 for U.S. Appl. No. 14/512,104, of Templeton, T., et al., filed Oct. 10, 2014.
Non-Final Office Action mailed Nov. 21, 2013 for U.S. Appl. No. 14/052,009, of Wilson, M., et al., filed Oct. 11, 2013.
Non-Final Office Action mailed Jul. 19, 2012, for U.S. Appl. No. 12/903,758, of Wilson, M., et al., filed Oct. 13, 2010.
"Reading magnetic cards (almost) for free," Lekernel's Scrapbook, ("Lekernel"), Jan. 26, 2009, Retrieved from the Internet URL: http://lekernel.net/blog/?p=12, on May 5, 2011, pp. 1-2.
"MSR500EX (Mini123EX) Portable Magnetic Stripe Card Reader," Tyner, Apr. 27, 2007, Retrieved from the Internet URL: http://www.tyner.com/magnetic/msr500ex.htm, on Apr. 22, 2011, pp. 1-3.
Padilla, L., "Turning your mobile into a magnetic stripe reader," Retrieved from the Internet URL: http://www.gae.ucm.es/~padilla/extrawork/mobilesoundtrack.html, on Feb. 7, 2011, pp. 1-4.
Padilla, L., "Magnetic stripe reader circuit," Jan. 28, 1997, Retrieved from the Internet URL: http://www.gae.ucm.es/~padilla/extraworklmagamp.html, on May 5, 2011, pp. 1-7.
Padilla, L. "The simplest magnetic stripe reader," Jan. 27, 2003, Retrieved from the Internet URL: www.gae.ucm.esi~padilla/extrawork/soundtrack.html, on Dec. 21, 2009, pp. 1-5.
"Travel industry targeted for Palm PDA card reader," Retrieved from the Internet URL: http://www.m-travel.com/news/2001/08/travel__industry.html, on Apr. 19, 2011, pp. 1-2.
"Semtek to target healthcare with HandEra PDAs and PDA swipe card reader," Aug. 29, 2001, Retrieved from the Internet URL: http://www.pdacortex.com/semtek.htm, on Apr. 19, 2011, pp. 1-2.
"Semtek 3913 Insert Magnetic Card Reader 20 Pin Serial RS232," Product description, RecycledGoods.com, Retrieved from the Internet URL: http://www.recycledgoods.com/products/Semtek-3913-Insert-Magnetic-Card-Reader-20-Pi . . . , on Apr. 19, 2011, pp. 1-3.
"Credit Card Swiper and Reader for iPhone, iPad, Blackberry, Android and more," Retrieved from the Internet URL: http://hubpages.com/hub/Credit-Card-Swiper-and-Reader-for-iPhone-iPad-Blackberry-An . . . , on Apr. 20, 2011, pp. 1-2.
Titlow, J.P., "Roam pay is like Square for Blackberry (Plus Android, iOS and Desktops)," Dec. 1, 2010, Retrieved from the Internet URL: http://www.readwriteweb.com/biz/2010/12/roampay-is-like-square-for-bla.php, on Apr. 20, 2011, pp. 1-12.
Veneziani, V., "Use a cellphone as a magnetic card reader," Apr. 15, 2005, Retrieved from the Internet URL: http://hackaday.com/2005/04/15/use a-cellphone-as-a-magnetic-card . . . , on Feb. 7, 2011, pp. 1-10.
Buttell, A.E., "Merchants eye mobile phones to transact card payments," Feb. 3, 2010, Retrieved from the Internet URL: http://www.merchantaccountguide.com/merchant-account-news/cell-phone-credit-card-mer . . . , on Feb. 8, 2011, pp. 1-3.
"USB Magnetic Stripe Credit/Card Track-2 Reader and Writer (75/210BPI)," Deal Extreme (dealextreme.com), Nov. 15, 2008, (56) References Cited

OTHER PUBLICATIONS

Retrieved from the Internet URL: http://www.dealextreme.com/p/usb-magnetic-stripe-credit-debit-card-track-2-reader-and-wr . . . , on Feb. 8, 2011, pp. 1-3.

"Mophie Marketplace Magnetic Strip Reader/Case for iPhone 3G & 3GS—Grey," J&R (JR.com), Retrieved from the Internet URL: http://www.jr.com/mophie/pe/MPE_MPIP3GBLK/, on Feb. 8, 2011, pp. 1-1.

"Barcode scanner and Magnetic Stripe Reader (MSR) for Pocke . . . ," Tom's Hardware (tomshardware.com), Retrieved from the Internet URL: http://www.tomshardware.com/forum/24068-36-barcode-scanner-magnetic-stripe-reader-po . . . , on Feb. 8, 2011, pp. 1-2.

"A Magnetic Stripe Reader—Read Credit Cards & Driver Licences!," Articlesbase (articlesbase.com), Sep. 7, 2009, Retrieved from the Internet URL: http://www.articlesbase.com/electronics-articles/a-magnetic-stripe-reader-read-credit-cards- . . . , on Feb. 8, 2011, pp. 1-3.

Jones, R., "U.S. Credit Cards to get a high-tech makeover," Oct. 22, 2010, Retrieved from the Internet URL: http://lifeine.today.com/_news/2010/10/22/5334208-us-credit-cards-to-get-a-high-tech-mak . . . , on Feb. 8, 2011, pp. 1-8.

"Arduino magnetic stripe decoder," Instructables, Retrieved from the Internet URL: http://www.instructables.com/id/Arduino-magneticstripe-decorder/, on Feb. 8, 2011, pp. 1-5.

"Magnetic Stripe Reader (MSR) MSR7000-100R," Motorola Solutions, Retrieved from the Internet URL: http://www.motorola.com/business/US-EN/MSR7000-100R_US-EN.do?vgnextoid=164fc3 . . . , on Feb. 8, 2011, pp. 1-1.

"Pay@PC" Retrieved from the Internet URL: http://www.merchantanywhere.com/PAY_AT_PCT@PC.htm, on Feb. 11, 2011, pp. 1-2.

"Get paid on the spot from your mobile phone," Retrieved from the Internet URL: http://payments.intuit.com/products/basic-payment-solutions/mobile-credit-card-processin . . . , on Feb. 11, 2011, pp. 1-3.

"Touch-Pay Wireless Credit Card Processing," MerchantSeek, Retrieved from the Internet URL: http://www.merchantseek.com/wireless-credit-card-processing.htm, on Feb. 11, 2011, pp. 1-5.

"Announcement: Semtek Introduces Side Swipe II Card Reader for Wireless Devices," Brighthand, Retrieved from the Internet URL: http://forum.brighthand.com/pdas-handhelds/173285-announcement-semtek-introduces-sid . . . , on Apr. 19, 2011, pp. 1-2.

Grandison, K., "vTerminal Credit Card Processing App for AuthorizeNet and PayPal Payflow Pro for Curve 8350 8500 8900 and Bold 9000," Retrieved from the Internet URL: http://www.4blackberry.net/tag/business-tools/vterminal-credit-card-processing-app-for-authorizenet-and-paypal-payflow-pro-for-curve-8350-8500-890-download-2075.html, on Mar. 30, 2015, pp. 1-4.

Harris, A., "Magnetic Stripe Card Spoofer," Aug. 4, 2008, Retrieved from the Internet URL: http://hackaday.com/2008/08/04/magnetic-stripe-card-spoofer/, on Apr. 25, 2011, pp. 1-11.

"Headphone Jack (3.5mm)," Retrieved from the Internet URL: http://www.phonescoop.com/glossary/term.php?gid=440, on May 5, 2011, pp. 1-1.

"2.5mm Headset Jack," Retrieved from the Internet URL: http://www.phonescoop.com/glossary/term.php?gid=360, on May 5, 2011, pp. 1-1.

"Reference Designations for Electrical and Electronics Parts and Equipment," Engineering Drawing and Related Documentation Practices, ASME Y14.44/2008, The American Society of Mechanical Engineers, Nov. 21, 2008, pp. 1-31.

Acidus, "Mag-stripe Interfacing—A Lost Art," Retrieved from the Internet URL: http://www.scribd.com/doc/18236182/Magstripe-Interfacing#open_ . . . , on Feb. 7, 2011, pp. 1-4.

"Mag-stripe readers The hunt for a homebrew mag-stripe reader that'll work with modern," Jan. 16, 2009, Retrieved from the Internet URL: http://www.hak5.org/forums/index.php?showtopic=11563&st=20, on Apr. 25, 2011, pp. 1-6.

Kuo, Y-S et al., "Hijacking Power and Bandwidth from the Mobile Phone's Audio Interface," Proceedings of the First ACM Symposium on Computing for Development, (DEV'10), Dec. 17, 2010, pp. 1-10.

Website: www.alexwinston.com, Aug. 31, 2009, pp. 1-5.

"Magnetic Card Reader," lekernel.net~scrapbook, Retrieved from the Internet URL: http://lekernel.net/scrapbook/old/cardreader.html, on Apr. 25, 2011, pp. 1-4.

"Magnetic stripe reader/writer," Retrieved from the Internet URL: http://www.gae.ucm.es/-padilla/extrawork/stripe.html, on Dec. 21, 2009, pp. 1-2.

Lucks, S., "Two-Pass Authenticated Encryption Faster than Generic Composition," H. Gilbert and H. Handschuh (Eds.): FSE 2005, LNCS 3557, © International Association for Cryptologic Research 2005, pp. 284-298.

Bauer, G.R. et al., "Comparing Block Cipher Modes of Operation on MICAz Sensor Nodes," 17th Euromicro International Conference on Parallel, Distributed and Network-based Processing, 2009, Feb. 18-20, 2009, pp. 371-378.

European Search Report and Opinion for European Patent Application No. 11 786 731.7, mailed Mar. 28, 2014.

Office Action for European Patent Application No. 11 786 731.7, mailed Jul. 16, 2015.

Non-Final Office Action mailed Sep. 30, 2011, for U.S. Appl. No. 12/903,753, of McKelvey, J., et al., filed Oct. 13, 2010.

Final Office Action mailed Jul. 6, 2012, for U.S. Appl. No. 12/903,753, of McKelvey, J., et al., filed Oct. 13, 2010.

Non-Final Office Action mailed Jul. 8, 2013 for U.S. Appl. No. 12/903,753, of McKelvey, J., et al., filed Oct. 13, 2010.

Notice of Allowance mailed Oct. 10, 2013, for U.S. Appl. No. 12/903,753, of Mckelvey, J., filed Oct. 13, 2010.

Final Office Action mailed Apr. 24, 2013 for U.S. Appl. No. 12/903,758, of Wilson, M., et al., filed Oct. 13, 2010.

Notice of Allowance mailed Aug. 6, 2013 for U.S. Appl. No. 12/903,758, of Wilson, M., et al., filed Oct. 13, 2010.

Notice of Allowance mailed Apr. 4, 2014, for U.S. Appl. No. 14/052,009, of Wilson, M., et al., filed Oct. 11, 2013.

Notice of Allowance mailed Jul. 30, 2014, for U.S. Appl. No. 14/052,009, of Wilson, M., et al., filed Oct. 11, 2013.

Non-Final Office Action mailed Sep. 30, 2011, for U.S. Appl. No. 13/010,976, of Babu, A. R., et al., filed Jan. 21, 2011.

Final Office Action mailed Jun. 12, 2012, for U.S. Appl. No. 13/010,976, of Babu, A. R., et al., filed Jan. 21, 2011.

English-language translation of Final Rejection for Japanese Application No. 2014-025525, mailed Oct. 20, 2015.

Notice of Allowance mailed Nov. 13, 2015, for U.S. Appl. No. 13/298,487, of Lamba, K., et al., filed Nov. 17, 2011.

Corrected Notice of Allowance mailed Nov. 18, 2015, for U.S. Appl. No. 14/578,107, of Wade, J., et al., filed Dec. 19, 2014.

Notice of Allowance mailed Nov. 19, 2015, for U.S. Appl. No. 13/298,491, of Lamba, K., et al., filed Nov. 17, 2011.

Corrected Notice of Allowance mailed Nov. 19, 2015, for U.S. Appl. No. 13/298,510, of Lamba, K., et al., filed Nov. 17, 2011.

Notice of Allowance mailed Nov. 20, 2015, for U.S. Appl. No. 13/298,501, of Babu, A., et al., filed Nov. 17, 2011.

Notice of Allowance mailed Nov. 23, 2015 for U.S. Appl. No. 14/189,997, of Lamfalusi, M., et al., filed Feb. 25, 2014.

Non-Final Office Action mailed Dec. 14, 2015, for U.S. Appl. No. 13/298,506, of Lamba, K., et al., filed Nov. 17, 2011.

Notice of Allowance mailed Jan. 12, 2016, for U.S. Appl. No. 13/298,534, of Lamba, K. et al., filed Nov. 17, 2011.

Final Office Action mailed Jan. 15, 2016, for U.S. Appl. No. 29/493,212, of Edwards, T., et al., filed Jun. 6, 2014.

\* cited by examiner

TONE-BASED WAKE UP CIRCUIT FOR CARD READER

BACKGROUND

Consumers can interact with merchants to conduct various financial payment transactions. For example, a consumer can conduct a transaction with a merchant at a point-of-sale system using cash, a transaction card, or other transaction instrument. Conventional systems can include expensive and bulky financial transaction electronics, as may include a card reader for payment cards (e.g., debit or credit cards), a cash drawer, monitors, keyboards, and various other electronic devices. Some point-of-sale systems require multiple types of card readers and/or complex and bulky card-reading equipment in order to accept multiple types of payment cards. Some systems include a card reader that is inserted into a port, such as the audio jack, of a mobile device to read data off a payment card and provide the information to the mobile device.

BRIEF DESCRIPTION OF THE DRAWINGS

In order to describe the manner in which features of the disclosure can be obtained, a more particular description of the principles will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Systems and methods in accordance with various embodiments of the present disclosure overcome one or more of the above-referenced and other deficiencies in conventional approaches to conducting financial transactions. In particular, in accordance with various embodiments, approaches provide for a card reader that is used in performing a payment transaction at a point-of-sale system.

The card reader includes an audio jack configured to be inserted into an audio jack of a mobile device, a slot for receiving a payment card, a media reading device for reading information off the payment card and a wake up circuit.

The wake up circuit includes a conditioning circuit, a comparator and an envelope detector. The conditioning circuit comprises a capacitor coupled to an audio input of the audio jack of the mobile device, and two evenly valued resistors coupled to a microphone bias signal, whereby the capacitor is configured to block any DC component on the audio input and whereby the two evenly valued resistors are configured to bias the microphone bias signal to a biased input voltage. The comparator has a positive terminal and a negative terminal, the positive terminal of the comparator being coupled to the audio input, and the negative terminal being coupled to the biased input voltage, whereby the comparator is configured to output a signal whenever the voltage on the positive terminal is greater than the voltage on the negative terminal. The envelope detector is connected to the output of the comparator, the output of the comparator being a square wave, the envelope detector configured to convert the square wave to a DC voltage signal and provide the DC voltage signal to a voltage regulator connected to the output of the envelope detector.

In some implementations, the card reader is able to detect a rising edge of the microphone bias voltage associated with plugging in the card reader to a mobile device and will turn on accordingly. However, the card reader typically has software that instructs the microcontroller of the card reader to shut the card reader off at appropriate times (for example, after a certain amount of time of non-use). Thus, a problem arises in situations where a card reader is left plugged into a mobile device after it is powered down by the microcontroller as the microphone bias will not change. It is thus desirable to have a means which turn the card reader back on when it is ready to be used again. One possible approach to achieving this goal is to monitor the read head to turn the card reader on in response to a card swipe. However, this monitoring circuitry drains the internal battery of the card reader. With this in mind, embodiments of the present invention propose a solution to turning on the card reader without consuming the battery power of the card reader and without the need to disconnect and reconnect the card reader (i.e. the microphone bias remains present and unchanged). This solution comes in the form of a tone or audio signal, for example provided by the mobile device to which the card reader is connected, which wakes up the card reader using the wake up circuit. Advantageously, such a card reader provides its own ability to turn on and turn off as desired without consuming the internal battery.

Although the system of the present invention is designed so that a user does not necessarily hear the wake up tone, certain situations exist where the tone may be played back to a user, e.g., a user plugs in headphones instead of the card reader, or the user uses headphones in conjunction with the card reader via a Y-splitter inserted into an audio jack of a mobile device. With this in mind, it is desired to provide a tone that is both audibly pleasing to the user and capable of triggering the wake up circuit to wake up the card reader. One example of such a tone is a chime which begins at a lower frequency and ramps or steps up to a higher frequency. By varying the frequency, the probability that a mobile device is capable of transmitting at least a portion of the tone to wake up the card reader is greatly increased.

Figure 1A:
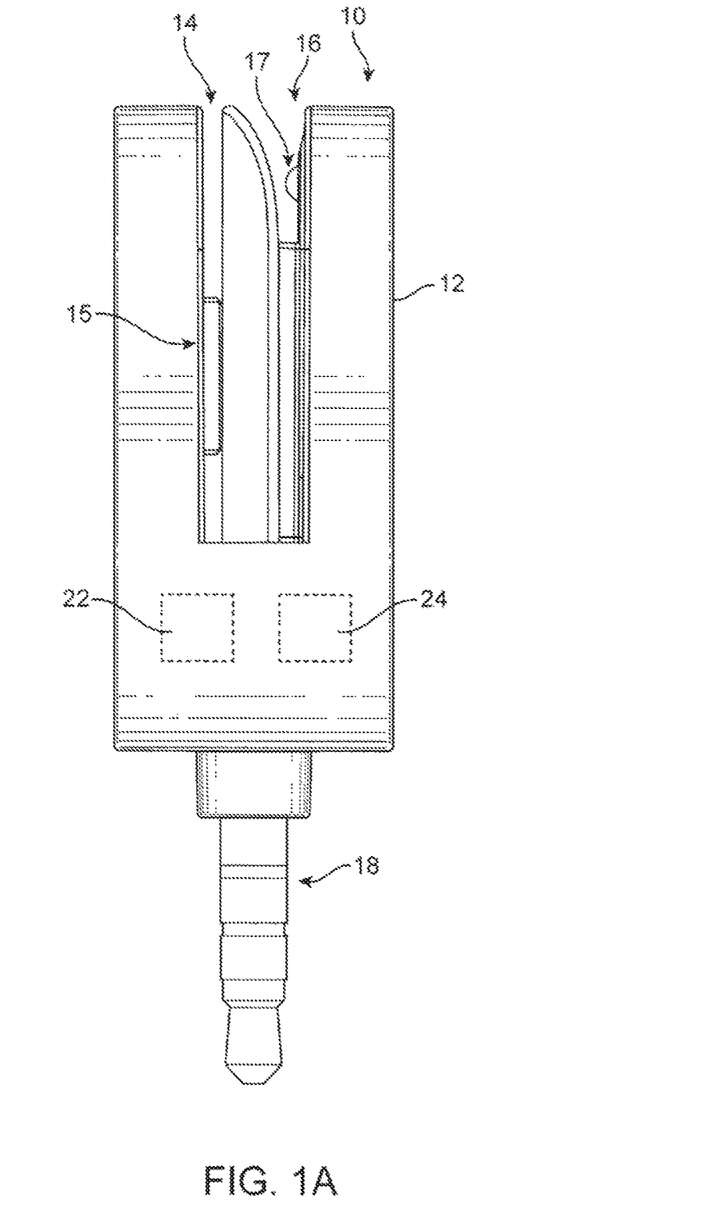
FIG. 1A illustrates a side perspective view of an example of an external structural diagram of a card reader, in accordance with various embodiments.

Other advantages, variations, and functions are described and suggested below as may be provided in accordance with the various embodiments. FIG. 1A illustrates a side perspective view of an example of an external structural diagram of a card reader, in accordance with various embodiments. In the example of FIG. 1A, card reader 10 is shown to comprise at least a housing 12 having a first slot 14 for receiving magnetic stripe cards and a second slot 16 for receiving EMV or chip-type cards. The first slot includes a read head 15 embedded on a wall of slot 14. The second slot includes a contact 17 to make electrical contact with a chip of an EMV card to perform payment of EMV cards. The card reader 10 includes a signal plug 18 extending out from the housing 12, a wake up circuit 22, as described in greater detail herein, and can also include a battery 24 to provide power to the card reader and/or to provide power to the internal components of the card reader.

Figure 1B:
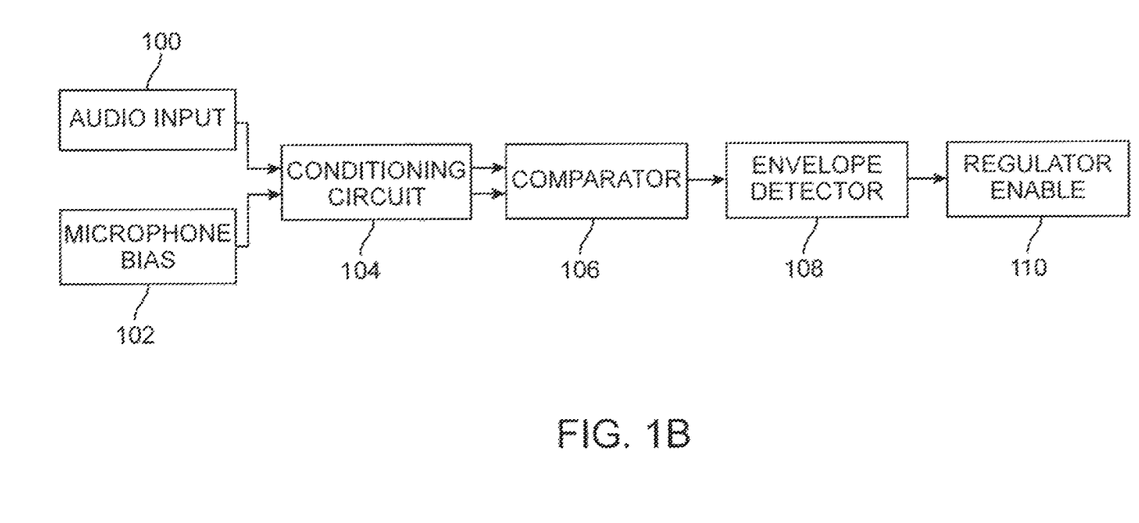
FIG. 1B illustrates an example block diagram of a tone-based wake up circuit for a portable card reader in accordance with an embodiment.

FIG. 1B illustrates an example block diagram of a tone-based wake up circuit for a portable card reader in accordance with an embodiment. A conditioning circuit 104 is configured to receive both an audio input 100 and a microphone bias 102 from an audio output jack of a computing device running point of sale software. The audio input 100 is comprised of a tone-based audio signal, such as an audible chime or song, used to wake up the card reader and may contain both an AC and a DC component. Prior to being input into comparator 106, the DC component of audio signal 100 is removed through the use of at least one DC blocking capacitor in conditioning circuit 104. Conditioning circuit 104 also includes two resistors coupled to an input voltage (Vcc) provided by microphone bias 102, the two resistors configured to bias Vcc to a biased input voltage. In an embodiment, the two resistors are two evenly valued resistors so that the biased input voltage is a value substantially in the middle of a range from Vcc to ground.

After conditioning via conditioning circuit 104, the audio input and the biased input voltage are received by the positive and negative input terminals of comparator 106, respectively. From here, comparator 106 is configured to compare the two signals and output a logical high value whenever the voltage on the positive input terminal is greater than the voltage on the negative input terminal. Due to the AC audio input at the positive input terminal of comparator 106, the output of comparator 106 is typically a square wave signal. Given that this square wave output signal oscillates at the same frequency as audio input 100, it is necessary to ensure the output of comparator 106 is asserted long enough for the wake up circuit to react regardless of the frequency of audio input 100. For example, if a single high-pitched wake up tone with a frequency of 20 kHz were received by the wake up circuit from audio input 100, the resultant square wave output signal of comparator 106 would have an "on time", or a period of time where the output value is logical high, of 25 μs per period. Depending on the components used in the card reader, this may not be enough time for the wake up circuit to recognize the wake up tone and turn the card reader on. With this in mind, envelope detector 108 is configured to monitor the output of comparator 106 and convert the square wave output signal into a substantially DC voltage signal. The DC voltage signal output from envelope detector 108 is directly coupled to a voltage regulator enable pin 110 that allows a voltage regulator to provide power to the portable card reader in response to a wake up tone.

Figure 2:
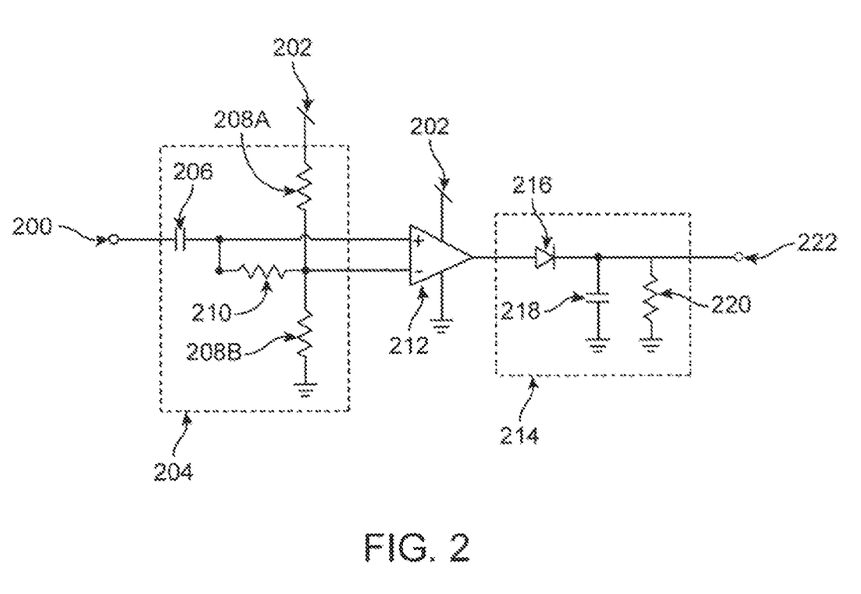
FIG. 2 illustrates an example circuit diagram of a tone-based wake up circuit in accordance with an embodiment.

Reference is now made to FIG. 2 illustrating an example circuit diagram of a tone-based wake up circuit in accordance with an embodiment. The circuit begins with the receipt of two input signals, namely audio input 200 and microphone bias 202, from an audio output jack of a computing device running point of sale software. Prior to comparison by comparator 212, these input signals are modified by conditioning circuit 204 which, in certain embodiments, may contain DC blocking capacitor 206, biasing resistors 208A and 208B, and coupling resistor 210. As previously discussed, audio input 200 contains a tone-based audio signal used to stimulate the wake up circuit to power the card reader and may be comprised of both an AC and a DC component. As audio input 200 passes through conditioning circuit 204, DC blocking capacitor 206 removes any DC component from audio input 200 resulting in an AC coupled audio input signal. This allows the DC voltage level of the audio input signal to be properly re-established to a level within the range of comparator 212 as discussed below in relation to coupling resistor 210.

Conditioning circuit 204 also creates a biased input voltage at the negative input terminal of comparator 212 by biasing the input voltage (Vcc) provided by microphone bias 202 using biasing resistors 208A and 208B. In an embodiment, biasing resistors 208A and 208B are of the same value so that the DC voltage level of the biased input voltage is substantially in the middle of a range from Vcc to ground. Conditioning circuit 204 also includes a coupling resistor 210 having a large value, which weakly couples the AC audio input signal to the biased input voltage created by biasing resistors 208A and 208B. In doing so, coupling resistor 210 sets a DC voltage level on the audio input signal at the positive input terminal of comparator 212 that is substantially the same value as the DC voltage level of the biased input voltage at the negative input terminal of comparator 212. This ensures that the audio input signal at the positive input terminal of comparator 212 stays within a range from Vcc to ground.

Once the two signals have been conditioned, comparator 212 compares the audio input signal on the positive input terminal with the biased input voltage on the negative input terminal. If comparator 212 determines that the value of the audio input signal is greater than the value of the biased input voltage, comparator 212 is configured to output a logical high value. As discussed in reference to FIG. 1B, the AC component of the audio input signal causes comparator 212 to produce a square wave signal at its output. To ensure the wake up circuit has ample time to react in response to a potentially high frequency wake up tone, envelope detector 214 is used to convert the square wave output signal of comparator 212 to a substantially DC signal. When a logical high value is received at the input of envelope detector 214, diode 216 begins to conduct allowing capacitor 218 to store charge. When the input of envelope detector 214 transitions to a logical low value, diode 216 stops conducting but the logical high value remains at the output of the envelope detector due to the stored charge on capacitor 218. Capacitor 218 slowly discharges through resistor 220 until a subsequent pulse in the square wave signal of comparator 212 recharges capacitor 218 by forcing diode 216 to conduct once again. In this manner, envelope detector 214 is able to provide a logical high DC signal to voltage regulator enable pin 222 throughout the entire duration of the wake up tone. This provides ample time for the wake up circuit of the present invention to power on the card reader from a low power sleep state and relinquishes power control to a controller of the card reader. From here, the controller of the card reader can execute software instructions to keep the card reader on, or issue a shutdown command to return the card reader to a low power sleep state. Once the wake up tone has ended, the square wave signal output by comparator 212 will cease, allowing capacitor 218 to fully discharge to a logical low value through resistor 220.

Figure 3:
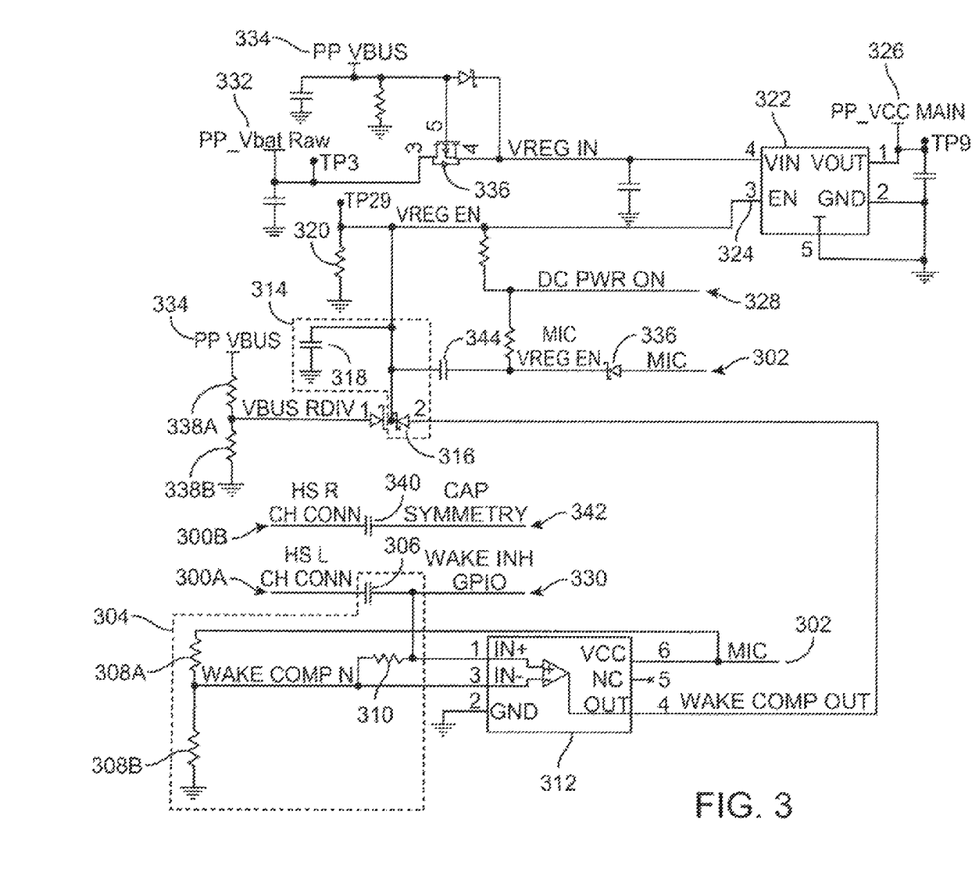
FIG. 3 illustrates an example schematic diagram of a tone-based wake up circuit in accordance with an embodiment.

Referring now to FIG. 3, an example schematic diagram of a tone-based wake up circuit is shown in accordance with an embodiment of the present invention. The wake up circuit receives an audio input signal containing a wake up tone from an audio output jack of a computing device running point of sale software. The audio input signal is typically a stereo signal which contains both a left audio channel 300A and a right audio channel 300B. However, in certain embodiments, a single channel mono audio input signal may be used. The present embodiment only monitors the left audio channel 300A for a wake up tone, although other embodiments may monitor only the right audio channel 300B or both audio channels. The left audio channel 300A is received by conditioning circuit 304 which contains DC blocking capacitor 306, biasing resistors 308A and 308B, and coupling resistor 310. Conditioning circuit 304 also receives an input voltage from microphone bias 302.

Biasing resistors 308A and 308B can be two evenly valued resistors, for example, of approximately 499 k ohms that bias the input voltage received by microphone bias 302 to create a biased input voltage at the negative input terminal of comparator 312. DC blocking capacitor 306, which may be approximately 1000 pF, serves to remove any DC component from the audio input signal of left audio channel 300A. Equivalent capacitor 340, which is the same value as DC blocking capacitor 306, is coupled to right audio channel 300B to provide load symmetry between both audio channels. A coupling resistor 310 with a value of approximately 499 k ohms weakly couples the biased input voltage created by biasing resistors 308A and 308B to the conditioned left audio channel 300A. In doing so, coupling resistor 310 re-establishes the DC voltage level of the conditioned left audio channel 300A to a value that is substantially the same as the DC voltage level of the biased input voltage. This ensures that the conditioned audio input signal at the positive input terminal of comparator 312 remains within the comparator's acceptable voltage range.

Comparator 312 is a rail-to-rail input comparator capable of operation on low supply voltages. In an embodiment, one rail of comparator 312 is coupled to the input voltage (Vcc) received from microphone bias 302, and the other rail is coupled to a low impedance ground. Comparator 312 is configured to compare the voltage of the audio input signal on the positive input terminal with the biased input voltage on the negative input terminal. If comparator 312 determines that the voltage present on the positive input terminal is greater than the voltage on the negative input terminal, comparator 312 is configured to output a logical high value that is substantially the same value as the input voltage received from microphone bias 302. In doing so, comparator 312 effectively amplifies the low voltage audio input signal to a DC voltage substantially the same as microphone bias 302.

When a tone-based wake up signal is received by the wake up circuit, comparator 312 typically produces a square wave at its output due to the AC component of the audio input signal. Envelope detector 314 serves to convert this square wave signal into a substantially DC signal that is asserted long enough for the wake up circuit to power on the card reader in response to a wake up tone. To do so, envelope detector 314 employs both a diode 316 and a capacitor 318, wherein the anode of capacitor 318 is directly coupled to a voltage regulator enable pin 324 of a voltage regulator 322. In an embodiment diode 316 can be a Schottky diode with a low voltage drop to minimize the energy lost from the comparator's output signal. Diode 316 must also be capable of fast switching speeds to keep up with potential high frequency wake up tones. Upon receipt of a logical high value from the output of comparator 312, diode 316 begins to conduct. While diode 316 is in a conduction state, capacitor 318, which may be approximately 1000 pF, stores charge. When the square wave output from comparator 312 transitions to a logical low state such as ground, diode 316 stops conducting and capacitor 318 begins discharging its stored charged through resistor 320. However, resistor 320 is chosen to be a large value, such as 499 k ohms, so that capacitor 318 does not discharge too quickly between subsequent pulses of the square wave output. In this manner, the voltage level of capacitor 318 does not drop below the voltage level required to enable voltage regulator 322 via voltage regulator enable pin 324 throughout the entire duration of the wake up tone.

Once a wake up tone has triggered the wake up circuit to enable voltage regulator 322, a portable card reader and its associated controller (not shown) can be powered on from a low power sleep mode via main voltage 326. In doing so, the wake up signal on voltage regulator enable pin 324 signals the controller to wake up via main voltage 326 provided by voltage regulator 322. In other embodiments, the wake up signal of voltage regulator enable pin 324 may be directly coupled to both voltage regulator enable pin 324 and the controller of the card reader. From here, the controller of the card reader can latch voltage regulator 322 on by outputting a logical high value on input 328. This allows the controller of the card reader to keep voltage regulator 322 on without the presence of a wake up tone. The controller can also assert a logical low value on input 328 to shutdown voltage regulator 322 and return the card reader to a low power sleep mode. To prevent comparator 312 from causing power supply noise, the controller is also configured to set input 330 to a logical low value (i.e. ground). Additionally, the controller sets input 342 to ground so that an equivalent load is seen by both audio input channels.

In order to provide regulated voltage to the card reader via main voltage 326, voltage regulator 322 sources power from either a battery 332 or a USB charger 334 of the card reader. In scenarios where USB charger 334 is connected, a switch, such as P-channel MOSFET 336 of the present embodiment, can be used to disconnect battery 332. Doing so saves power on battery 332 for situations when USB charger 334 is not connected.

As previously discussed, the tone-based wake up circuit of the present invention is configured to power on a portable card reader in response to a wake up tone by enabling voltage regulator 322 via voltage regulator enable pin 324. However, in certain embodiments, other events aside from a wake up tone can trigger the wake up circuit to power on the card reader. For example, when a user inserts the portable card reader into an audio output port of a computing device running point of sale software, it is desirable to have the card reader powered on for immediate use. As such, the present embodiment includes diode 336 directly coupled to microphone bias 302 and a passive differentiator circuit formed by DC blocking capacitor 344 and resistor 320. When the card reader is plugged in, the voltage of microphone bias 302 allows diode 336 to turn on. The rising edge of microphone bias 302 associated with inserting the card reader causes the passive differentiator circuit to output a logical high value at voltage regulator enable pin 324. From here, the controller of the card reader can latch voltage regulator 322 on by outputting a logical high value on input 328 before DC blocking capacitor 344 discharges. Since microphone bias 302 is a substantially constant DC voltage, the output of the passive differentiator circuit which differentiates the signal from microphone bias 302 discharges to a logical low value after insertion of the card reader. This prevents the microphone bias signal coming through diode 336 from always asserting a logical high value at voltage regulator enable pin 324, but still allows the wake up circuit to power on the card reader when the card reader is plugged in. Additionally, this configuration allows the controller of the card reader to transition the card reader from an awake mode to a sleep mode while the microphone bias signal is still present by outputting a logical low value on input 328. In scenarios where USB charger 334 is connected, the power saving features inherent to the tone-based wake up circuit may no longer be necessary, and the card reader can remain in a powered on state. With this in mind, the voltage received from USB charger 334 is biased using resistors 338A and 338B to provide a DC signal to voltage regulator enable pin 324.

Figure 4:
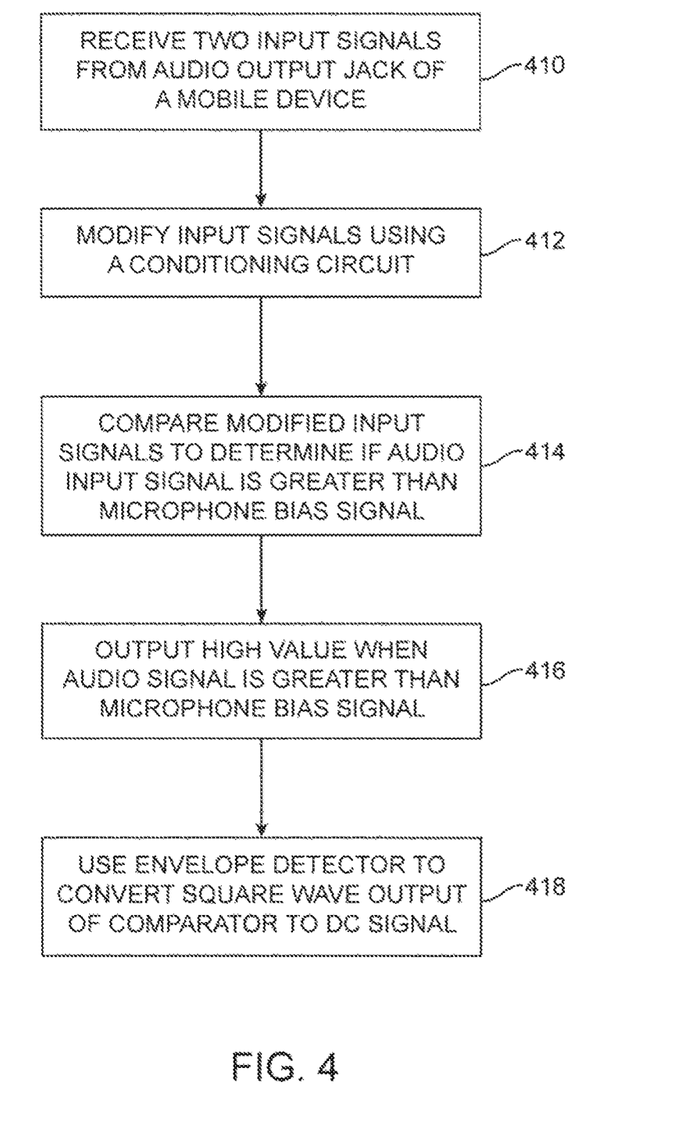
FIG. 4 illustrates an example process for waking up a card reader using a wake up circuit in accordance with various embodiments.

FIG. 4 illustrates an example process for waking up a card reader using a wake up circuit accordance with various embodiments. The example process being at 410 by receiving, at an audio plug of the card reader, an audio input signal and a microphone bias signal from the audio output jack of the mobile device. At 412, the input signals are modified using the conditioning circuit to produce a modified audio input signal and a modified microphone bias signal. At 414, the modified audio input signal and the modified microphone bias signal are compared using a comparator to output a third signal. The comparator has a positive terminal and a negative terminal, the positive terminal of the comparator is coupled to the audio input signal and the negative terminal is coupled to the modified microphone bias. At 416 the comparator is configured to output the third signal when the voltage on the positive terminal is greater than the voltage on the negative terminal. Meaning, the comparator outputs a third signal which is a square wave when the audio signal is greater than the microphone bias signal, indicating that a tone has been provided to the card reader to wake up the card reader. At 418, an envelope detector converts the third signal output of the comparator to a fourth signal. In an embodiment, the third signal is a square wave and the fourth signal being a substantially DC voltage signal. The fourth signal that is a substantially DC voltage signal is provided to an enable pin of a voltage regulator that is connected to the output of the envelope detector. The fourth signal provided to the enable pin of the voltage regulator can be used to signal the wake up circuit to turn the card reader into an awake mode from a sleep mode.

Having now described various example embodiments of the point-of-sale system used in a point-of-sale transaction, some example environments for conducting a financial transaction at a point-of-sale system will now be described. Other environments and applications of the point-of-sale system should be apparent to those ordinarily skilled in the art.

Figure 5:
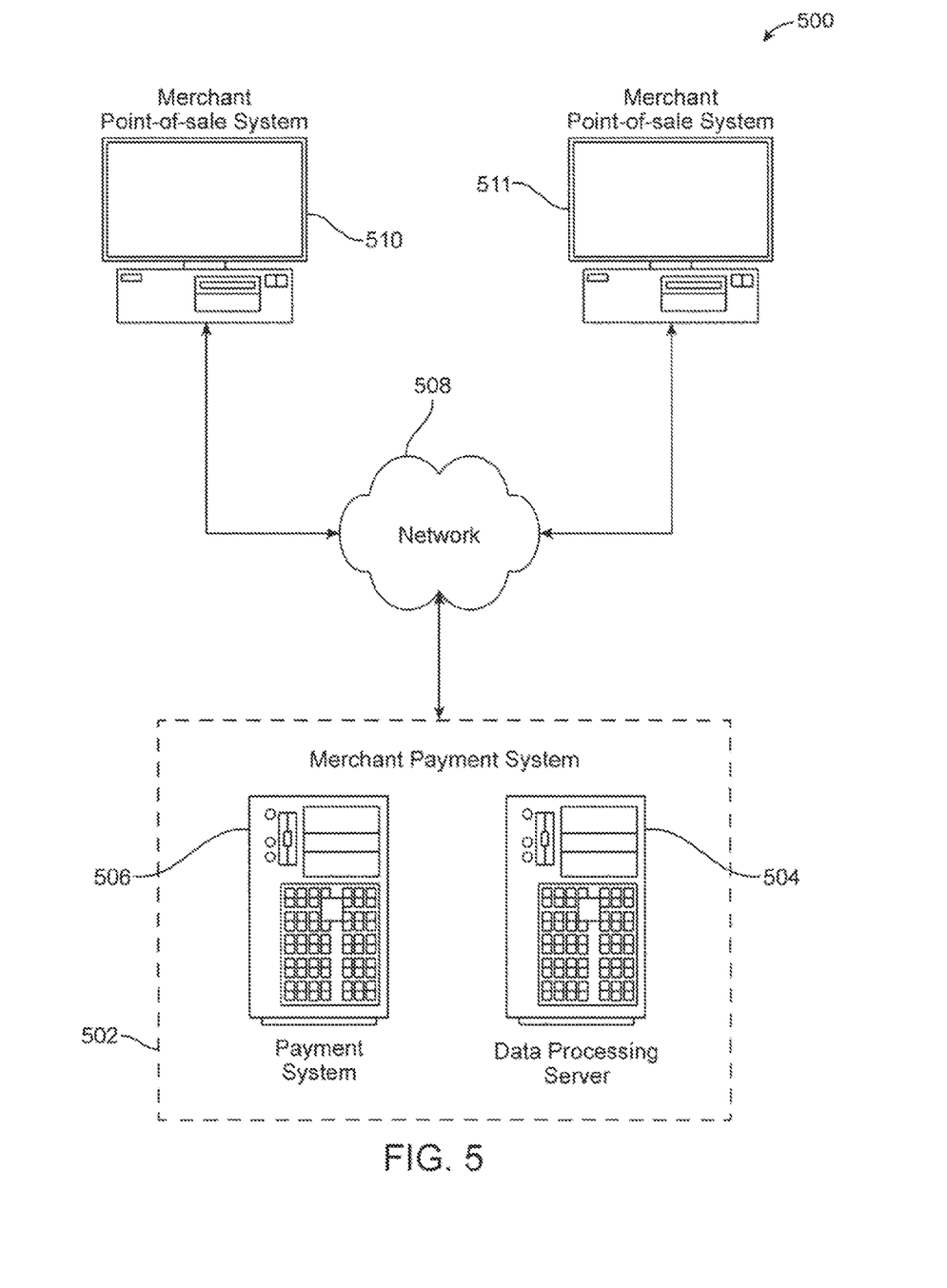
FIG. 5 illustrates an example environment for conducting a financial payment transaction using a card reader in accordance with an embodiment.

FIG. 5 illustrates an example environment for conducting a financial transaction at a point-of-sale system in accordance with various embodiments. In this example, the example environment 500 includes a merchant payment system 502 for processing transactions between a customer and a merchant. The merchant payment system includes, for example, a data processing server 504 and a payment server 506. The data processing server can be implemented as computer programs on one or more computers in one or more locations, in which the systems, components, and techniques described below, can be implemented. The operation of the payment server is described below in reference to FIG. 6. The example environment also includes computing devices, e.g., transaction registers or other point-of-sale systems, corresponding to the merchant 510 and 511.

As described, the point-of-sale systems 510 and 511 can include the hub (e.g., hub 204) and computing device, where the computing device can be coupled to or in communication with the merchant payment system through a data communication network 508, e.g., the Internet. These devices each generally include a memory, e.g., a random access memory (RAM), for storing instructions and data, and a processor for executing stored instructions. The devices and can each include one or more components, e.g., software or hardware, that are operable to send and receive requests, messages, or other types of information over the network. Some examples of computing devices include personal computers, cellular phones, handheld messaging devices, laptop computers, personal data assistants, tablet devices, and the like.

The network 508 can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The devices and the referral system can communicate over the network using wired or wireless connections, and combinations thereof.

Each of the computing devices is configured to send to the merchant payment system respective financial data that corresponds to a financial transaction that was processed by the computing device. The financial data can include, for example, data stored in a financial payment card, e.g., Track 1 data, receipt email addresses, and information describing a card-less payment account. Other examples of financial data that can be captured includes purchase data, e.g., an itemized listing of purchases, card mix data, geolocation data indicating a geographic location of a particular transaction, online/offline card data, data describing the merchant, e.g., merchant category codes (MCCs), and any type of data that is received upon a customer's authentication into a social network.

Figure 6:
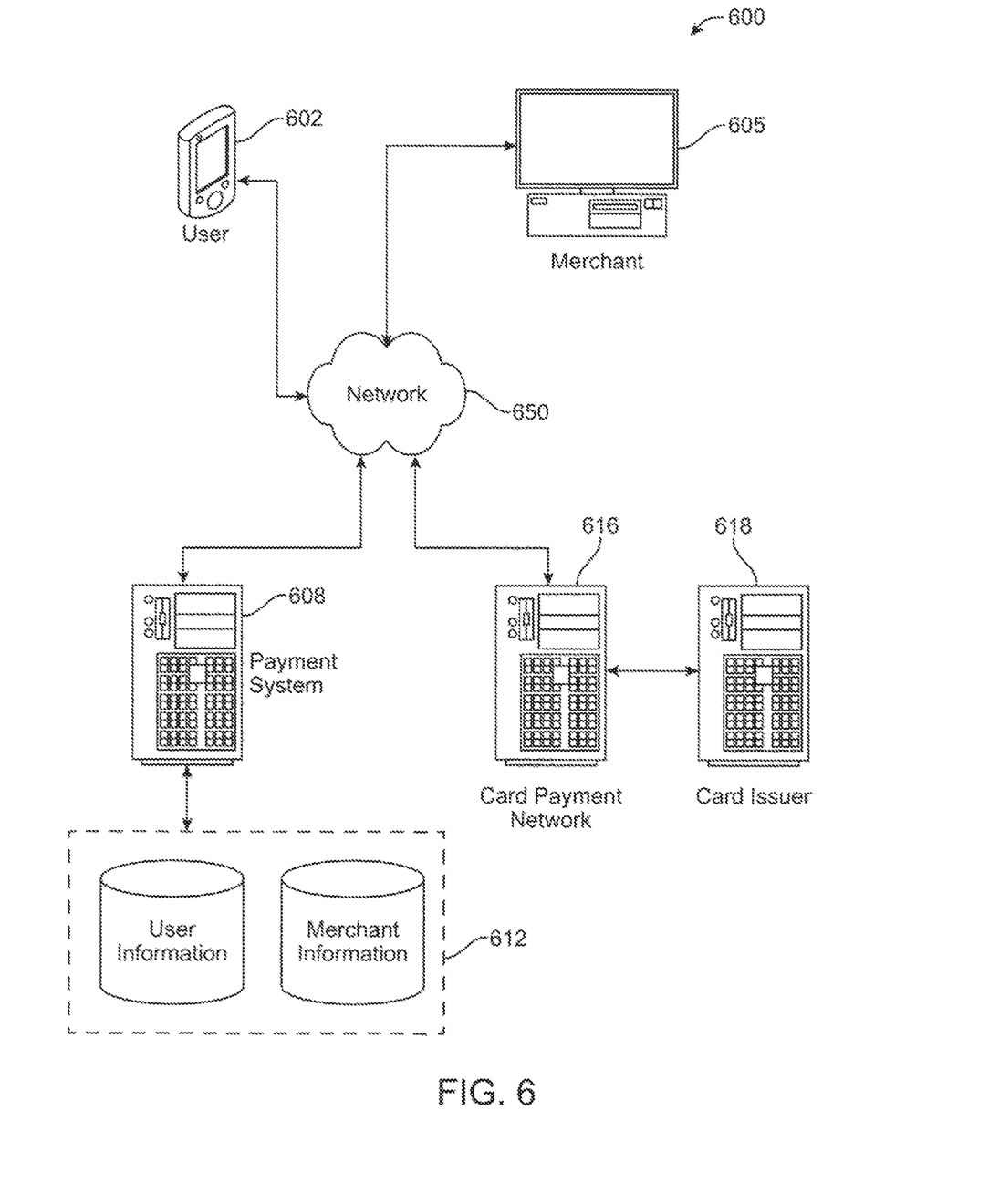
FIG. 6 illustrates an example environment for implementing a merchant payment system using a card reader in accordance with an embodiment.

FIG. 6 illustrates an example of an environment 600 for implementing a payment service network. Although a mobile device environment is described for purposes of explanation, different environments may be used, e.g., a web-based environment, to implement various embodiments. The example environment includes a payment system 608, which can be implemented as computer programs on one or more computers in one or more locations, in which the systems, components, and techniques described below can be implemented. The example environment also includes a user device 602 and a merchant device 605.

The user device and the merchant device can each be a computer coupled to the payment system through a data communication network 650, e.g., the Internet. The user device and the merchant device each generally include a memory, e.g., a random access memory (RAM), for storing instructions and data, and a processor for executing stored instructions. The user device and the merchant device can each include one or more components, e.g., software or hardware, that are configured to respectively determine a geographic location of the user device or the merchant device, using, for example, various geolocation techniques, e.g., a global positioning system (GPS). Further, the user device and the merchant device can each be any appropriate device operable to send and receive requests, messages, or other types of information over the network. Some examples of user devices include personal computers, cellular phones, handheld messaging devices, laptop computers, personal data assistants, tablet devices, and the like.

The network can include any appropriate network, including an intranet, the Internet, a cellular network, a local area network, a wide area network, or any other such network, or combination thereof. Components used for such a system can depend at least in part upon the type of network, the environment selected, or both. Protocols and components for communicating over such a network are well known and will not be discussed herein in detail. The payment system, the merchant device, and the user device can communicate over the network using wired or wireless connections, and combinations thereof.

As used in this specification, a financial transaction is a transaction that is conducted between a customer and a merchant at a point-of-sale. When paying for a financial transaction, the customer can provide the merchant with cash, a check, or credit card for the amount that is due. The merchant can interact with a point-of-sale device, e.g., merchant device, to process the financial transaction. During financial transactions, the point-of-sale device can collect data describing the financial transaction, including, for example, the amount of payment received from customers.

In some implementations, the payment system is configured to accept card-less payment transactions from customers, e.g., the customer. As used in this specification, a card-less payment transaction is a transaction conducted between the customer and a merchant at the point-of-sale during which a financial account of the customer is charged without the customer having to physically present a financial payment card to the merchant at the point-of-sale. That is, the merchant need not receive any details about the financial account, e.g., the credit card issuer or credit card number, for the transaction to be processed.

Before conducting card-less payment transactions, the customer typically creates a user account with the payment system. The customer can create the user account, for example, by interacting with a user application that is configured to perform card-less payment transactions and that is running on the user device. When creating a user account with the payment system, the customer will provide information of the customer, data describing a financial account of the customer, e.g., credit card number, expiration date, and a billing address. This user information can be securely stored by the payment system, for example, in a user information database. To accept card-less payment transactions, the merchant typically creates a merchant account with the payment system by providing information describing the merchant including, for example, a merchant name, contact information, e.g., telephone numbers, the merchant's geographic location address, and one or more financial accounts to which funds collected from users will be deposited. This merchant information can be securely stored by the payment system, for example, in a merchant information database.

The payment system is configured to perform card-less payment transactions. The payment system can include one or more servers that are configured to securely perform electronic financial transactions, e.g., electronic payment transactions, between a customer and a merchant, for example, through data communicated between the user device and the merchant device. Generally, when a customer and a merchant enter into an electronic financial transaction, the transaction is processed by transferring funds from a financial account associated with the user account to a financial account associated with the merchant account.

The payment system is configured to send and receive data to and from the user device and the merchant device. For example, the payment system can be configured to send data describing merchants to the user device using, for example, the information stored in the merchant information database 612. For example, the payment system can communicate data describing merchants that are within a threshold geographic distance from a geographic location of the user device, as described in this specification. The data describing merchants can include, for example, a merchant name, geographic location, contact information, and an electronic catalogue, e.g., a menu that describes items that are available for purchase from the merchant.

In some embodiments, the payment system is configured to determine whether a geographic location of the user device is within a threshold geographic distance from a geographic location of the merchant device. The payment system can determine a geographic location of the user device using, for example, geolocation data provided by the user device. Similarly, the payment system can determine a geographic location of the merchant device using, for example, geolocation data provided by the merchant device or using a geographic address, e.g., street address, provided by the merchant. Depending on the implementation, the threshold geographic distance can be specified by the payment system or by the merchant.

Determining whether the user device is within a threshold geographic distance of the merchant device can be accomplished in different ways including, for example, determining whether the user device is within a threshold geographic radius of the merchant device, determining whether the user device is within a particular geofence, or determining whether the user device can communicate with the merchant device using a specified wireless technology, e.g., Bluetooth or Bluetooth low energy (BLE). In some embodiments, the payment system restricts card-less payment transactions between the customer and the merchant to situations where the geographic location of the user device is within a threshold geographic distance from a geographic location of the merchant device.

The payment system can also be configured to communicate with a computer system 616 of a card payment network, e.g., Visa or MasterCard, over the network, or over a different network, for example, to conduct electronic financial transactions. The computer system 616 of the card payment network can communicate with a computer system 618 of a card issuer, e.g., a bank. There may be computer systems of other entities, e.g., the card acquirer, between the payment system and the computer system 618 of the card issuer.

The customer operating the user device that is within a threshold geographic distance of the merchant can interact with a user application running on the user device to conduct a card-less payment transaction with the merchant. While interacting with the user application, the customer can select the merchant, from a listing of merchants, with whom the customer wants to enter into a card-less payment transaction. The user can select the merchant, for example, by selecting a "check in" option associated with the merchant. The user device can communicate data to the payment system indicating that the customer has checked in with the merchant. In response, the payment system can communicate data to notify the merchant device that the user has checked in. A merchant application running on the merchant device can notify the merchant that the user has electronically checked in with the merchant through a display screen of the merchant device.

Once checked in, the customer can collect, or request, items that are available for purchase from the merchant. When the customer is ready to enter into the card-less payment transaction, the customer can, for example, approach a point-of-sale for the merchant and identify him or herself. For example, the customer can verbally notify the merchant that the customer wants to enter into a card-less payment transaction and can provide the merchant with the customer's name. The merchant can then interact with the merchant application to select the customer, from a listing of customers that have checked in with the merchant, to initiate a card-less payment transaction for the items being purchased by the customer. For example, the merchant can determine a total amount to bill the customer for the items being purchased. The customer can verbally approve the total amount to be billed and, in response, the merchant can submit a request for a card-less payment transaction for the total amount to the payment system. In response, the payment system can obtain, for example, from the user information database, data describing a financial account associated with a user account of the customer to which the total amount will be billed.

The payment system can then communicate with the computer system of a card payment network to complete an electronic financial transaction for the total amount to be billed to the customer's financial account. Once the electronic financial transaction is complete, the payment system can communicate data describing the card-less payment transaction to the user device, e.g., an electronic receipt, which can, for example, notify the customer of the total amount billed to the user for the card-less payment transaction with the particular merchant.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A computer-implemented method for waking up a card reader connected to an audio jack of a mobile device using a wake up circuit disposed within the card reader, the method comprising:
   receiving, at an audio plug of the card reader, a microphone bias signal from the audio output jack of the mobile device;
   transitioning the card reader to an awake mode in response to a rising edge of the microphone bias signal;
   transitioning the card reader to a sleep mode using a microprocessor while the microphone bias signal is still present;
   receiving, at the audio plug of the card reader, an audio input signal from the audio output jack of the mobile device;
   conditioning the audio input signal to produce a conditioned audio input signal having an amplitude between an amplitude of the microphone bias signal and ground;
   conditioning the microphone bias signal to produce a conditioned microphone bias signal having substantially half the amplitude of the microphone bias signal;
   comparing the conditioned audio input signal and the conditioned microphone bias signal to output a third signal using a comparator, the comparator configured to output the third signal having an amplitude substantially the same as the microphone bias signal when the voltage of the conditioned audio input signal is greater than the voltage of the conditioned microphone bias signal;
   converting the third signal to a fourth signal using an envelope detector, the third signal being a square wave and the fourth signal being a substantially DC voltage signal; and
   providing the fourth signal to an enable pin of a voltage regulator that is connected to the output of the envelope detector.

2. The method of claim 1 further comprising:
   enabling the voltage regulator via the fourth signal to provide power to the microprocessor of the card reader to execute a preliminary instruction to turn the card reader into the awake mode.

3. The method of claim 2 further comprising:
   providing a fifth signal from the microprocessor of the card reader, after the card reader is in the awake mode, to signal the wake up circuit to go back to a sleep mode.

4. The method of claim 1 wherein the conditioning circuit conditions the audio input signal and the microphone bias signal by including a DC blocking capacitor to remove any DC component from the audio input signal, a pair of evenly valued biasing resistors to bias the microphone bias signal, and a coupling resistor to couple the conditioned audio input signal and the conditioned microphone bias signal.

5. The method of claim 4 further comprising connecting the audio input and the capacitor to ground via the microprocessor when the card reader is the awake mode, and disconnecting the audio input and the capacitor from ground when the card reader is in the sleep mode.

6. The method of claim 1 wherein the envelope detector comprises a diode and a capacitor, wherein an anode of the capacitor is directly coupled to the enable pin of the voltage regulator, and when the comparator outputs a high logical value, the diode begins to conduct, and the capacitor stores the charge, and when the square wave output from the comparator transitions to a low state, the diode stops conducting and the capacitor begins to discharge through the resistor.

7. A wake up circuit for a portable card reader comprising:
a conditioning circuit comprising a capacitor coupled to an audio input, and two evenly valued resistors coupled to an input voltage (Vcc), whereby the capacitor is configured to block any DC component on the audio input and whereby the two evenly valued resistors are configured to bias the Vcc to a biased input voltage of about a value in the middle of a range of Vcc to ground;
a comparator having a positive terminal and a negative terminal, the positive terminal of the comparator being coupled to the audio input, and the negative terminal being coupled to the biased input voltage, whereby the comparator is configured to output a signal whenever the voltage on the positive terminal is greater than the voltage on the negative terminal;
an envelope detector connected to the output of the comparator, the output of the comparator being a square wave, the envelope detector configured to convert the square wave to a DC voltage signal; and
an enable pin of a voltage regulator connected to the output of the envelope detector, the enable pin configured to receive the DC voltage signal, and to use the DC voltage signal to execute a preliminary instruction to turn the system on.

8. The wake up circuit of claim 7 further comprising:
a microprocessor configured to connect the audio input and the capacitor to ground when the card reader is an awake mode, and disconnect the audio input and the capacitor from ground when the card reader is in a sleep mode.

9. The wake up circuit of claim 7 wherein the audio input signal is a stereo signal comprising a left audio channel and a right audio channel.

10. The wake up circuit of claim 7 wherein the audio input signal is a single channel mono audio input signal.

11. The wake up circuit of claim 7 wherein the biasing resistors each have a value of approximately 499 k-Ohms and the DC blocking capacitor has a value of 1000 pF.

12. The wake up circuit of claim 7 wherein the comparator comprises a rail-to-rail comparator with a first rail coupled to the input voltage and a second rail coupled to low impedance ground.

13. The wake up circuit of claim 7 wherein the envelope detector comprises a diode and a capacitor, an anode of the capacitor being directly coupled to the enable pin of the voltage regulator.

14. The wake up circuit of claim 13 wherein the diode is a Schottky diode.

15. A portable card reader comprising:
an audio plug configured to be inserted into an audio jack of a mobile device;
a slot for receiving a payment card;
a media reading device for reading information off the payment card;
a wake up circuit comprising:
a conditioning circuit comprising a capacitor coupled to an audio input of the audio jack of the mobile device, and two evenly valued resistors coupled to a microphone bias signal, whereby the capacitor is configured to block any DC component on the audio input and whereby the two evenly valued resistors are configured to bias the microphone bias signal to a biased input voltage;
a comparator having a positive terminal and a negative terminal, the positive terminal of the comparator being coupled to the audio input, and the negative terminal being coupled to the biased input voltage, whereby the comparator is configured to output a signal whenever the voltage on the positive terminal is greater than the voltage on the negative terminal; and
an envelope detector connected to the output of the comparator, the output of the comparator being a square wave, the envelope detector configured to convert the square wave to a DC voltage signal and provide the DC voltage signal to a voltage regulator connected to the output of the envelope detector.

16. The card reader of claim 15 further comprising a microprocessor configured to connect the audio input and the capacitor to ground when the microprocessor has the system in an awake mode, and disconnect the audio input and the capacitor from ground when the microprocessor has the system in a sleep mode.

17. The card reader of claim 15 wherein the comparator is a rail-to-rail comparator.

18. The card reader of claim 15 wherein the envelope detector comprises a diode and a capacitor, an anode of the capacitor being directly coupled to an enable pin of the voltage regulator.

19. The card reader of claim 15 wherein the conditioning circuit further comprises a coupling resistor configured to couple the biased input voltage to the audio input.

20. The card reader of claim 15 wherein the wake up circuit transitions the card reader from a sleep mode into an awake mode when the audio plug is inserted into the audio jack of the mobile device, and wherein a microprocessor transitions the card reader back into the sleep mode while the microphone bias signal is still present, and wherein the audio input causes the wake up circuit to transition the card reader back into the awake mode.

* * * * *